(12) United States Patent
Aoki et al.

(10) Patent No.: US 6,961,912 B2
(45) Date of Patent: Nov. 1, 2005

(54) FEEDBACK MECHANISM FOR USE WITH VISUAL SELECTION METHODS

(75) Inventors: Paul M. Aoki, Foster City, CA (US); Richard R. Burton, Palo Alto, CA (US); Amy K. Hurst, Altanta, GA (US); Allison G. Woodruff, Foster City, CA (US); Victoria M. E. Bellotti, San Francisco, CA (US)

(73) Assignee: Xerox Corporation, Stamford, CT (US)

(*) Notice: Subject to any disclaimer, the term of this patent is extended or adjusted under 35 U.S.C. 154(b) by 835 days.

(21) Appl. No.: 09/906,667

(22) Filed: Jul. 18, 2001

(65) Prior Publication Data

US 2003/0016253 A1 Jan. 23, 2003

(51) Int. Cl.⁷ .................................................. G09G 5/00
(52) U.S. Cl. .................... 715/863; 715/814; 715/821; 715/859; 345/179; 345/161; 345/173
(58) Field of Search ........................... 345/863, 864, 345/853, 854, 855, 856, 858, 859–861, 764, 345/767, 705, 708, 709, 179, 173, 161, 157; 715/813–815, 715/821–823, 856–863, 767–768

(56) References Cited

U.S. PATENT DOCUMENTS

| | | | | |
|---|---|---|---|---|
| 5,513,309 A | * | 4/1996 | Meier et al. ................. | 715/860 |
| 5,721,851 A | | 2/1998 | Cline et al. ................. | 345/349 |
| 5,910,800 A | | 6/1999 | Shields et al. ............... | 345/336 |
| 5,978,848 A | * | 11/1999 | Maddalozzo et al. ........ | 709/227 |
| 5,983,244 A | | 11/1999 | Nation ......................... | 707/501 |
| 6,020,881 A | * | 2/2000 | Naughton et al. .......... | 715/740 |
| 6,057,844 A | * | 5/2000 | Strauss ........................ | 715/863 |
| 6,125,385 A | * | 9/2000 | Wies et al. .................. | 709/203 |
| 6,184,883 B1 | * | 2/2001 | Bates et al. ................. | 715/794 |
| 6,243,091 B1 | * | 6/2001 | Berstis ........................ | 345/839 |
| 6,271,840 B1 | * | 8/2001 | Finseth et al. .............. | 715/513 |
| 6,321,158 B1 | * | 11/2001 | DeLorme et al. ........... | 701/201 |
| 6,342,908 B1 | * | 1/2002 | Bates et al. ................. | 345/798 |
| 6,396,500 B1 | * | 5/2002 | Qureshi et al. ............. | 345/473 |
| 6,405,238 B1 | * | 6/2002 | Votipka ....................... | 709/203 |
| 6,661,439 B1 | * | 12/2003 | Kunieda et al. ............ | 715/850 |
| 6,704,034 B1 | * | 3/2004 | Rodriguez et al. .......... | 715/860 |
| 2002/0075333 A1 | * | 6/2002 | Dutta et al. ................. | 345/862 |

OTHER PUBLICATIONS

P. M. Aoki, et al., "Tap Tips: Lightweight Discovery of Touchscreen Targets", Extended Abstracts, ACM SIGCHI Conf. on Human Factors in Computing Systems, Seattle, WA, Mar. 2001, 237-238.

(Continued)

*Primary Examiner*—Tadesse Hailu
(74) *Attorney, Agent, or Firm*—Oliff & Berridge, PLC

(57) ABSTRACT

A feedback mechanism usable with graphical user interface systems that do not have a cursor improves the usefulness of such graphical user interfaces. Locating, identifying and/or selecting hyperlink targets or active areas within a displayed image map or within a Web page is facilitated by providing distinctions to the hyperlink targets or active areas or by providing other locational indicators for a designated time period in response to a single user gesture. The distinctions or locational indicators may be provided in combination with other distinctions or locational indicators to further aid the hyperlink target or active area location, identification and/or selection process. After a designated time period expires, the distinctions, locational indicators, or their combination, are removed from the display without any additional user gesture. This increases the efficiency and convenience of locating, identifying and/or selecting hyperlink targets or active areas in a graphical user interface system.

46 Claims, 17 Drawing Sheets

OTHER PUBLICATIONS

T. Berners-Lee et al., Hypertext Markup Language—2.0, RFC 1866, Internet Engineering Task Force, Marina Del Ray, CA. Nov. 1995; pp. 1-77.

J. F. Kelley et al. "IBM EXPO '92 Guest Services System", Proc. 37th HFES Annual Meeting, Oct. 1993; pp. 1-5.

R. Makkuni, "The Crossing Exhibit & The Future of the Cultural Learning Interface", Culture Track of the 9th World Wide Web Conference, Amsterdam, the Netherlands, May 2000.

R. McCool et al., NCSA HTTPd, National Center for Supercomputing Applications, University of Illinois, Urbana-Champign, IL, 1993-1996.

D. Ragget, HTML 3.2 Reference Specification, World-Wide Web Consortium, Boston, MA Jan 1997.

* cited by examiner

FEEDBACK MECHANISM FOR USE WITH VISUAL SELECTION METHODS

BACKGROUND OF THE INVENTION

1. Field of Invention

The invention relates to a feedback mechanism for use with visual selection methods in graphical user interface systems. The invention is particularly advantageous with regard to graphical user interface systems that do not have a cursor or the like.

2. Description of Related Art

Image maps are a widely used technique allowing users to perform graphical selections of hyperlink targets or active areas within a displayed image map. In a World Wide Web browser, for example, image maps are formed by associating an image with hyperlink targets or active areas. When a user clicks on one of the hyperlink targets or active areas, the browser displays an additional hypertext document. The additional document may provide additional information on the selected target, and/or provide a different, perhaps magnified, view of the originally displayed image map.

A cursor-based graphical user interface system relies on the location of the cursor within the graphical user interface being continuously defined. Typical graphical user interface systems provide indicators to help a user interact with a displayed image, such as, for example, an image map, and to interact with hyperlink targets or active areas within the displayed image. Therefore, whenever the location of the cursor is determined by the system to be in a predefined area on the image map, such as even only within a specific hyperlink target or active area or within the image map, the location or existence of the hyperlink target or active area is identified on the graphical user interface by displaying a locational indicator.

In particular, such conventional techniques, as in a cursor-based graphical user interface system, often rely on the cursor being positioned relative to one or more of the hyperlink targets or action areas without activating any of the controls on the cursor control device, such as a mouse, a joystick, a keyboard, a touch pad, a trackball, or the like. One such technique relies upon the cursor "hovering" over a hyperlink target or action area. Removing the locational indicator, or user tip, requires a separate gesture, such as moving the cursor control device.

More recent developments in image map or active area locating techniques have arisen, however, due to the increase in hand-held computing devices, such as personal digital assistants (PDAs), personal organizers, palmtops, or hand-held PCs. Such hand-held computing devices typically have a liquid crystal display (LCD) with a touch-sensitive screen. A stylus is used to enter data through the screen. An input device, such as a keypad, can also be included. These hand-held computing devices use the stylus or other instrument, in combination with the touch-sensitive display screen, rather than a cursor, to point to, and possibly select, specific locations within the graphical user interface. The stylus or other instrument in such hand-held computing devices performs functions similar to that of the combination of the cursor and the cursor control device in the above-described conventional cursor-based graphical user interface system.

In contrast to a cursor-based environment, a continuously-identified cursor location is not available in systems that use a stylus or the like, such as those systems described above. Therefore, locating hyperlink targets or active areas in an image map can be difficult, confusing, or at least frustrating to a user when a cursor having a continuously-defined location, such as in a mouse-oriented and/or cursor-oriented system, is not available to interact with the hyperlink targets or active areas within an image map.

Conventional techniques for interacting with an image map often fail when used with a system that does not use a cursor or the like. For example, systems, such as personal digital assistants, that do not have a cursor having a continuously-defined position within the graphical user interface, can not use such techniques. Pen-based graphical user interfaces and touch-screen-based graphical user interfaces are exemplary systems that do not have cursors that have continuously-defined positions within the graphical user interface.

In these cases, a hyperlink target or active area within an image map will not even be indicated to the user until the user generates a first specific gesture on that hyperlink target or active area. Thus, a user is left to guess where the hyperlink targets or active areas are located within an image map, unless the desired hyperlink target or active area is directly located by a first contact gesture. Conventional techniques therefore lack a level of efficiency or sophistication in locating hyperlink targets or active areas that would be advantageous to a user.

Pen-based graphical user interface systems similarly provide locational indicators or user tips that indicate the location of hyperlink targets or active areas within an image map when the stylus, for example, is placed within the boundaries of the image map. For example, in the known modal-type "slide to see" pen-based interaction technique, a user slides the stylus across the touch screen to identify the location of the hyperlink targets or active areas in an image map. The location of the hyperlink targets or active areas is displayed as long as contact is maintained between the stylus and the touch screen. The user then lifts the stylus to select the hyperlink target or active area that the stylus was in immediately before the stylus was lifted. Lifting the stylus, however, is an unnatural and unintuitive manner of selecting a hyperlink target or active area. Moreover, all of the locational indicators that were activated as a result of sliding the stylus across the image map remain visible at least until the stylus is lifted. These locational indicators clutter the image map, making the process of locating a desired hyperlink target or active area more difficult.

Additional modal-type techniques are possible. For example, locational indicators can be displayed while a hardware or software button is held down. This approach shares two problems with the "slide to see" technique. First, the user must remember at least one additional user interface gesture. Second, the user must execute input gestures to summon and dismiss the locational indicators.

On a different scale, touch-oriented systems with large display screens may continually flash or display various hyperlink targets or active areas to direct a user to, or identify to the user, the hyperlink targets or active areas within an image map. While such continuous flashing or displaying of hyperlink targets or active areas is reasonably conceivable with large display screens, handheld devices typically have very small display screens. Thus, in a typical pen-based graphical user interface environment having a small display screen, either all of the hyperlink targets or active areas will not be able to be shown, or cluttering and overlapping of the hyperlink targets or active areas may occur, making selecting a desired hyperlink target or active area difficult and subject to guessing by the user. Further-more, the number of continually flashing hyperlink targets or active areas is often distracting and unappealing to most users.

SUMMARY OF THE INVENTION

Thus, in various versions of the pen-based graphical user interface systems using a non-modal alternative to display locational indicators, either the locational indicators are not shown at all, or they are always shown. When the locational indicators are not shown, the result is frustrating guesswork navigation by the user, who is required to locate and activate the hyperlink targets or active areas without assistance. On the other hand, when the locational indicators are always shown, the result is a cluttered image map. Thus, in either case, inefficiencies in locating, identifying and/or selecting the hyperlink targets or active areas within an image map occur.

This invention provides systems and methods for indicating the locations of hyperlink targets or active areas in an image map.

This invention separately provides systems and methods for indicating the locations of hyperlink targets or active areas in graphical user interfaces that do not have cursors having continuously defined positions.

This invention separately provides systems and methods for indicating the locations of hyperlink targets or active areas in response to a gesture made against an image map when the gesture is not made within a hyperlink target or active area.

The systems and methods according to this invention address the inefficiencies in locating and/or selecting a hyperlink target or active area in a graphical user interface system. Because hyperlink targets or active areas in an image map may not be obvious to a user, locational indicators become important. In various exemplary embodiments, the locational indicators can be one or more highlighted images positioned relative to one or more hyperlink targets or active areas. In some exemplary embodiments, the locational indicators can be activated for all of the hyperlink targets or active areas in an image map. In other exemplary embodiments, only the n closest hyperlink targets or active areas closest to the location of a user's gesture within the cursorless graphical user interface can be activated. In this case, n is at least one, and can be any desired value.

The locational indicators may be, for example, highlighted frames or other alterations in appearance that give an indication of the regions of the graphical user interface that are occupied by the hyperlink targets or active areas. Alternatively, the locational indicators may be, for example, pop-up text boxes or windows having a navigational tool as simple as a single word or phrase such as "left" or "to the left", and/or may include, for example, a simple directional arrow to aid the user in locating, or navigating within an image map to a desired hyperlink target or active area located within an image map. In various other exemplary embodiments, the locational indicators may be any of a variety of other forms, individually or in combination, usable to direct a user to, or identify to a user, a desired hyperlink target or active area.

Various other exemplary embodiments of the systems and methods according to this invention provide a "tap-tip" image map navigation mechanism and method for cursorless graphical user interface systems. The "tap-tip" technique provides locational indicators to an image map. In these exemplary embodiments, the location of a hyperlink target or active area within a displayed image map is indicated for a limited duration to aid a user in locating and selecting a desired hyperlink target or active area within the image map.

The locational indicators of the hyperlink targets or active areas in the image map are not always visible, as in prior art methods. Nor are the hyperlink targets or active areas of the invention always hidden, as in other prior art methods. Rather, in various exemplary embodiments according to this invention, the locational indicators of the hyperlink targets or active areas within an image map appear when a user "taps" a designated number of times, such as once, in a non-active area of the image map. Tapping in or on a hyperlink target or active area does not produce the locational indicators because a hyperlink target or active area has been successfully selected.

When a hyperlink target or active area has not been successfully selected by a user's "tap", a "miss" gesture has occurred. As a result, a location indicator for at least one hyperlink target or active area in the image map is displayed. The displayed one or more locational indicators remain displayed for a designated time period, for example, no more than two seconds after the corresponding "miss" gesture. After the designated time period has elapsed, the displayed one or more locational indicators of the hyperlink target or active area are no longer displayed. The user may tap on one of the located or identified hyperlink targets or active areas indicated by the one or more locational indicators at any time to select or activate that hyperlink target or active area.

It should be appreciated that the one or more locational indicators do not need to appear suddenly and do not need to appear at exactly the same time. In various exemplary embodiments, the one or more locational indicators "fade in" during the designated time period. In further exemplary embodiments, the one or more locational indicators appear serially, with the locational indicators closest to the point of contact between the stylus and the touch screen appearing first.

Similarly, the one or more locational indicators do not need to disappear suddenly and do not need to disappear at exactly the same time. In various exemplary embodiments, the displayed one or more locational indicators begin "fading away" at some predetermined point within the designated time period. In various other exemplary embodiments, the one or more locational indicators disappear serially, with the locational indicators closest to the point of contact between the stylus and the touch screen disappearing first.

As a result of locating the hyperlink targets or active areas in a displayed image map by the "tap-tip" technique, such that resulting locational indicators are controllably displayed according to the systems and methods of this invention, the locational indicators do not clutter the image map display as the locational indicators disappear and/or fade away after the designated time. That is, the hyperlink targets or active areas are visibly located and/or identified only long enough for the user to note the location of one or many of the hyperlink targets or active areas. The noted location may be used to select a hyperlink target or active area immediately, if desired, or remembered for use later. Therefore, navigation of the image map becomes easier, particularly when a user's initial "tap" gesture to locate a hyperlink target or active area has missed the location of any hyperlink target or active area.

Further, because the hyperlink targets or active areas and the locational indicators fade away and become hidden after a designated period of time has elapsed, no additional gesture or input from the user is required to rid the image map of the locational indicators. This simplifies navigation and interaction with the graphical user interface and increases navigational efficiency. The techniques used to determine the designated time period may be varied depending on the needs of the user and the application program. In various exemplary embodiments, the designated time period may be fixed in advance, for example, at two seconds. A fixed time period is simple to implement and assures predictable behavior, an important quality in user interface design.

In various ones of these exemplary embodiments, the designated time period may also be set using user preference settings. Time period adjustments based on user preferences are also simple to implement and can give the user full control over the tip behavior. Such control is also an important quality in user interface design.

In various other exemplary embodiments, the designated time period may be determined adaptively, for example, using automatic adjustments made in response to a given user's actions. An adaptive time period can be used to adjust to variations in individual user's abilities, such as variations in user response time and reflexes.

Alternatively or additionally, in some exemplary embodiments, when a hyperlink target or active area in an image map is missed, a pop-up text or other locational indicator may appear for a similar designated time period, for example, two seconds, before the pop-up text or other locational indicator also fades away, or is otherwise no longer displayed on the image map. As a result, navigation of the image map is easier, as a user can use the pop-up text or other locational indicator to better locate a desired hyperlink target or active area.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail with reference to the following figures, wherein like numerals represent like elements, and wherein.

DETAILED DESCRIPTION OF PREFERRED EMBODIMENTS

Locating hyperlink targets or active areas in an image map display in a cursorless graphical user interface system requires identifying where the hyperlink targets or active areas are within the image map. Because hyperlink targets or active areas within an image map are not always visible, a user must often guess the location of a desired hyperlink target or active area by repeatedly tapping a stylus or other instrument against the image map until the location and/or identification of the desired hyperlink target or active area is determined.

Figure 1:
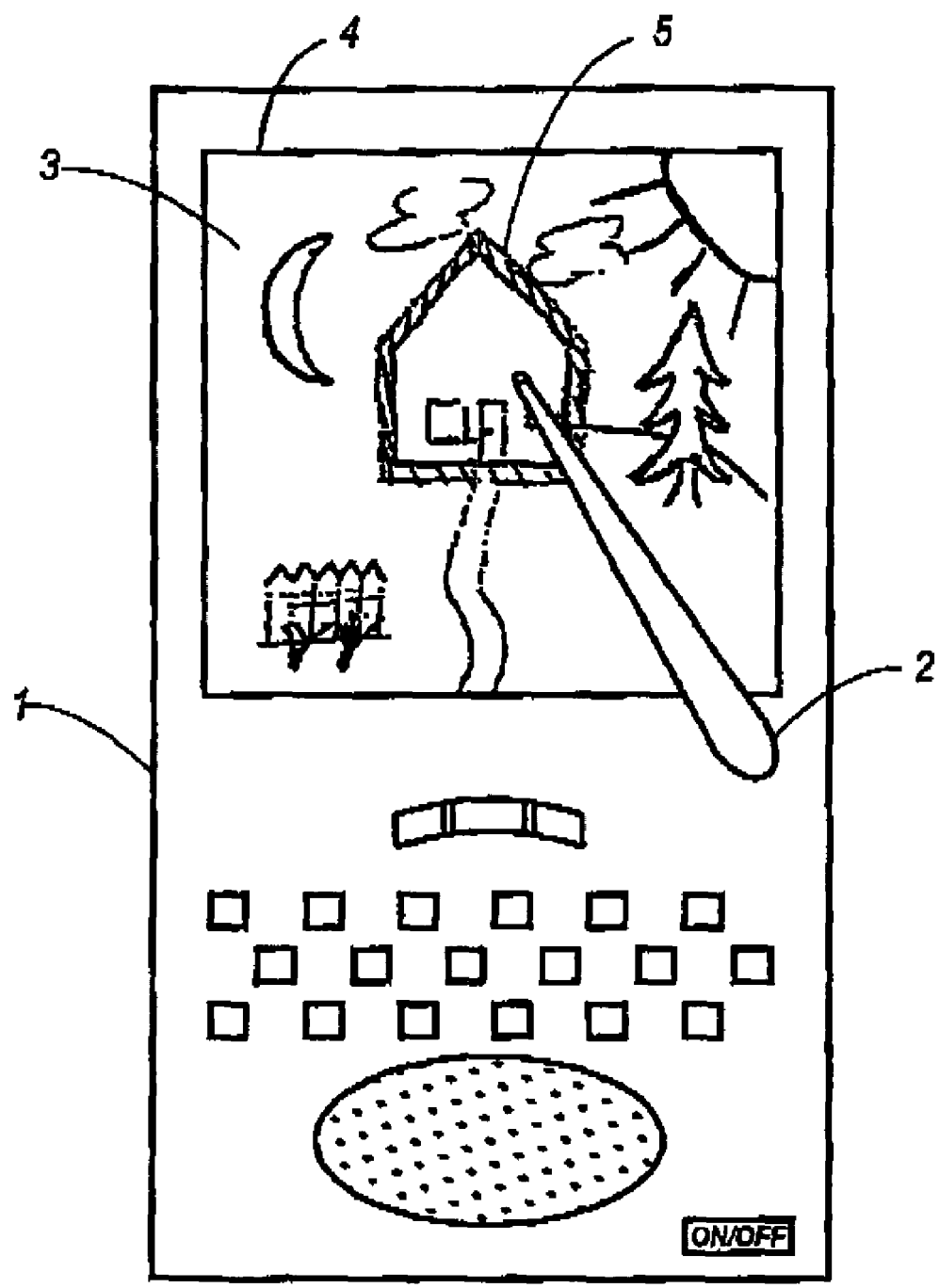
FIG. 1 shows a conventional image map within a handheld device.

As shown in FIG. 1, previous pen-based graphical user interface systems include hand-held devices 1 with a stylus, or other instrument, 2 usable as an input device. The stylus 2 can be used to locate hyperlink targets or active areas in an image map 3 on a display screen 4. Often, when the cursor or pen is not close to or over a hyperlink target or active area, the hyperlink targets or active areas are typically hidden, or otherwise not distinguishable, from the image displayed on the display screen 4. The hyperlink targets or active areas may be indistinguishable from the other graphics displayed in an image map as a result of the Web-page design color preferences being the same or similar color preferences of the user. In addition, the hyperlink targets or active areas may be indistinguishable from the other graphics displayed in an image map as a result of a graphical user interface system setting.

In previous pen-based computer systems that contain circuitry to determine the proximity of the stylus tip to the screen, hyperlink targets or active areas appear when the user holds the stylus 2 or other input device so that it 'hovers' over the screen position of a hyperlink target or active area. The visual appearance of the hyperlink target or active area is altered to distinguish that hyperlink target or active area from the rest of the image map 3, as shown, for example, by the highlighting of the hyperlink target or active area 5 in FIG. 1. Highlighting the hyperlink target or active area 5, in this instance, occurs only when the stylus 2 hovers above the display screen 4 within the bounds of the hyperlink target or active area 5.

Once a hyperlink target or active area is displayed in a visibly distinct format from the other graphical images in an image map in previous graphical user interface systems, the altered visual appearance, or highlighting, of the hyperlink target or active area remains active until a user actively removes the altered visual appearance, or highlighting, of the hyperlink target or active area 5 by lifting, sliding, or otherwise gesturing with the stylus 2. If an appropriate gesture is not performed by a user, then the altered visual appearance, or highlighting, of the hyperlink target or active area 5 remains displayed.

Figure 2:
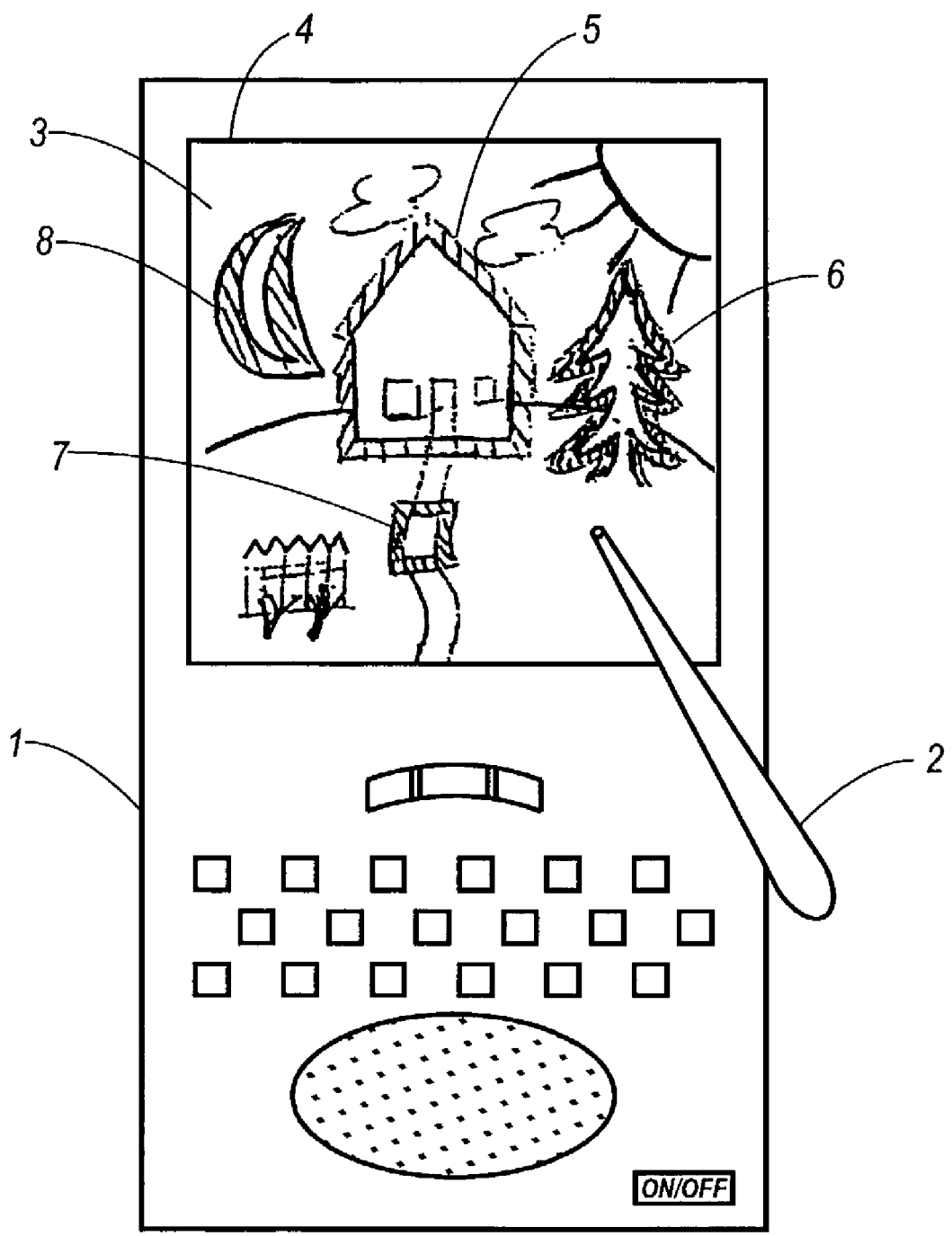
FIG. 2 shows a cluttering effect of highlighted targets in a conventional image map within a handheld device.

As shown in FIG. 2, in previous graphical user interface systems, a plurality of hyperlink targets or active areas 5, 6, 7 and 8 may exist in a single image map display. In the previous "slide to see" technique, the visual appearance of each of the hyperlink targets or active areas 5, 6, 7 and 8 is altered, or highlighted, relative to the other graphical images displayed on the display screen 4 upon the stylus 2 directly contacting the image map. Thus, multiple visibly distinct hyperlink targets or active areas 5, 6, 7 and 8 remain displayed unless the appropriate gesture to remove the altered visual appearance of each highlighted hyperlink target or active area 5, 6, 7 and 8 is performed by the user. The image map 3 therefore becomes cluttered in previous graphical user interface systems. As a result, the task of correctly locating and/or identifying a desired hyperlink target or active area becomes more difficult. Additionally, the cluttered display is aesthetically distracting and unappealing to most users. Further, the user must learn to perform the additional gestures required to remove highlighted hyperlink targets or active areas 5, 6, 7 and 8.

Accordingly, a cursorless graphical user interface system that can identify the location of hyperlink targets or active areas within an image map display by displaying each hyperlink target or active area and directing a user to each hyperlink target or active area by displaying locational indicators would be advantageous to a user. Providing the hyperlink target or active area locations and/or identifications and locational indicators without requiring a hyperlink target or active area to be directly contacted by the stylus or other instrument would be advantageous as well, particularly when the user has performed a gesture to the image map but has missed the desired hyperlink target or active area location. This would permit a user to receive locational information guiding the user to a hyperlink target or active area even when the user gesture to the image map has missed the hyperlink target or active area completely. This is likely to occur when the hyperlink targets or active areas are not readily apparent to a user because the hyperlink targets or active areas are not normally visibly distinguished from the other graphics displayed on the image map display screen.

Moreover, a cursorless graphical user interface system that automatically removes from the display screen those hyperlink targets or active areas and locational indicators that were previously made visibly distinct without requiring any additional gesture by a user would be advantageous as well. This would permit one to more easily locate a desired hyperlink target or active area without the necessity of learning additional gestures to remove locational indicators resulting from prior user gestures, as occurs in conventional graphical user interface systems.

Figure 3:
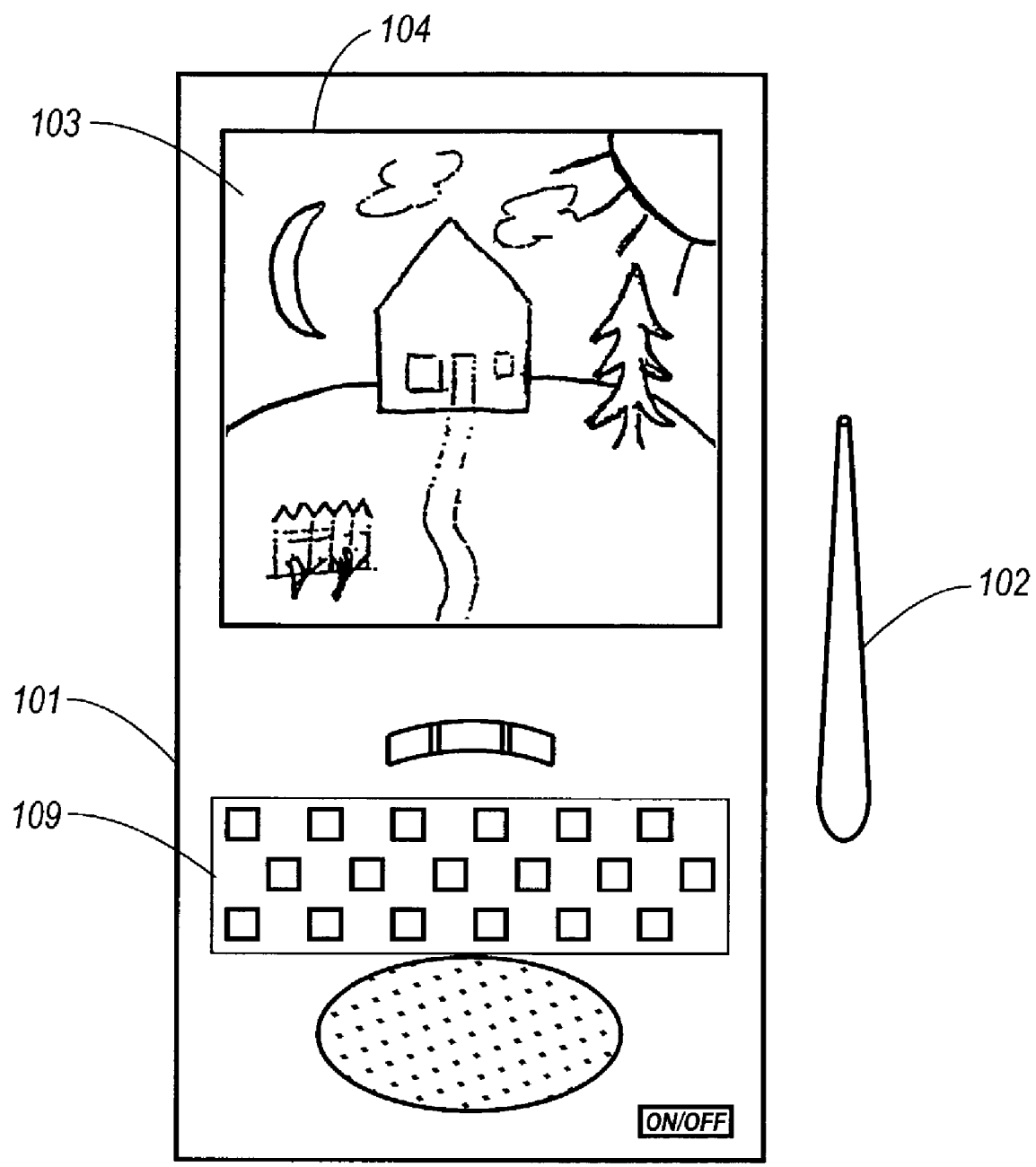
FIG. 3 shows a handheld device having an image map displayed without hyperlink target or active area distinctions displayed according to the invention.

FIG. 3 shows an exemplary embodiment of a cursorless graphical user interface system according to this invention. As shown in FIG. 3, a hand-held cursorless graphical user interface device 101 includes a stylus or other instrument 102 for contacting a display screen 104. The display screen 104 displays, for example, an image map 103. The displayed image map 103 may be varied according to manipulations of the stylus 102 as it directly interacts with the image map 103 and the display screen 104, or according to user-generated inputs from, for example, a keyboard 109, or any other known or later developed input device.

Figure 4:
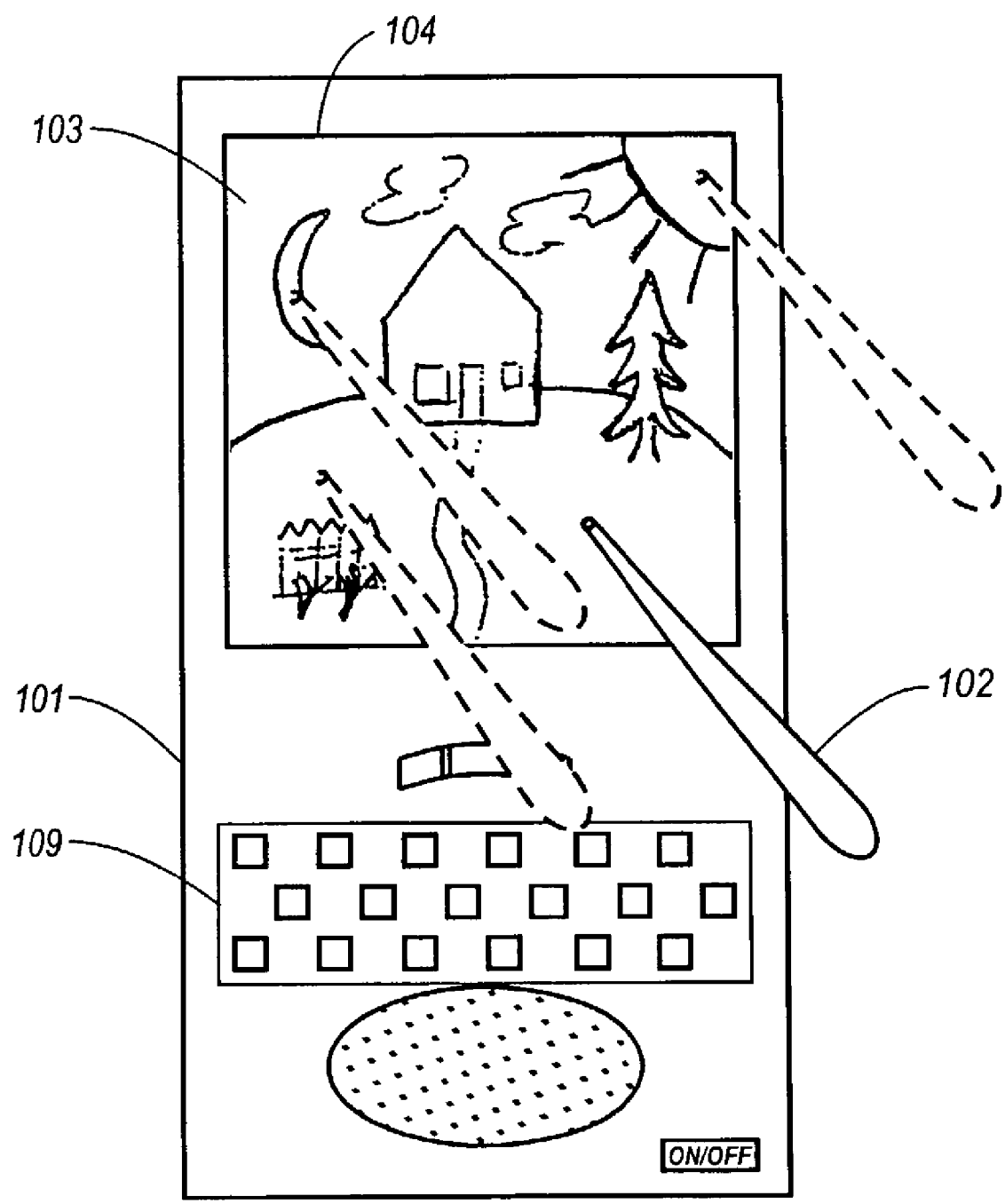
FIG. 4 shows exemplary user gesture positioning of a stylus to an image map within a handheld device according to the invention.

As shown in FIG. 4, for example, the stylus 102 is used by a user to touch various locations on the image map 103 when attempting to locate and/or identify hyperlink targets or active areas that are not readily apparent within the image map 103. Visual alteration or highlighting is used to assist the user in identifying, locating and/or selecting hyperlink targets or active areas. In FIG. 4, examples of various locations to which a user may touch the stylus 102 are shown by dashed lines. For example, a user may position the stylus 102 anywhere within the image map 103 to locate, identify and/or select the various hyperlink targets or active areas that may not be readily apparent within the displayed image map 103. If the stylus position within the image map 103 corresponds to a hyperlink target or active area, such as the hyperlink target or active area 108, then that hyperlink target or active area is selected.

Figure 5:
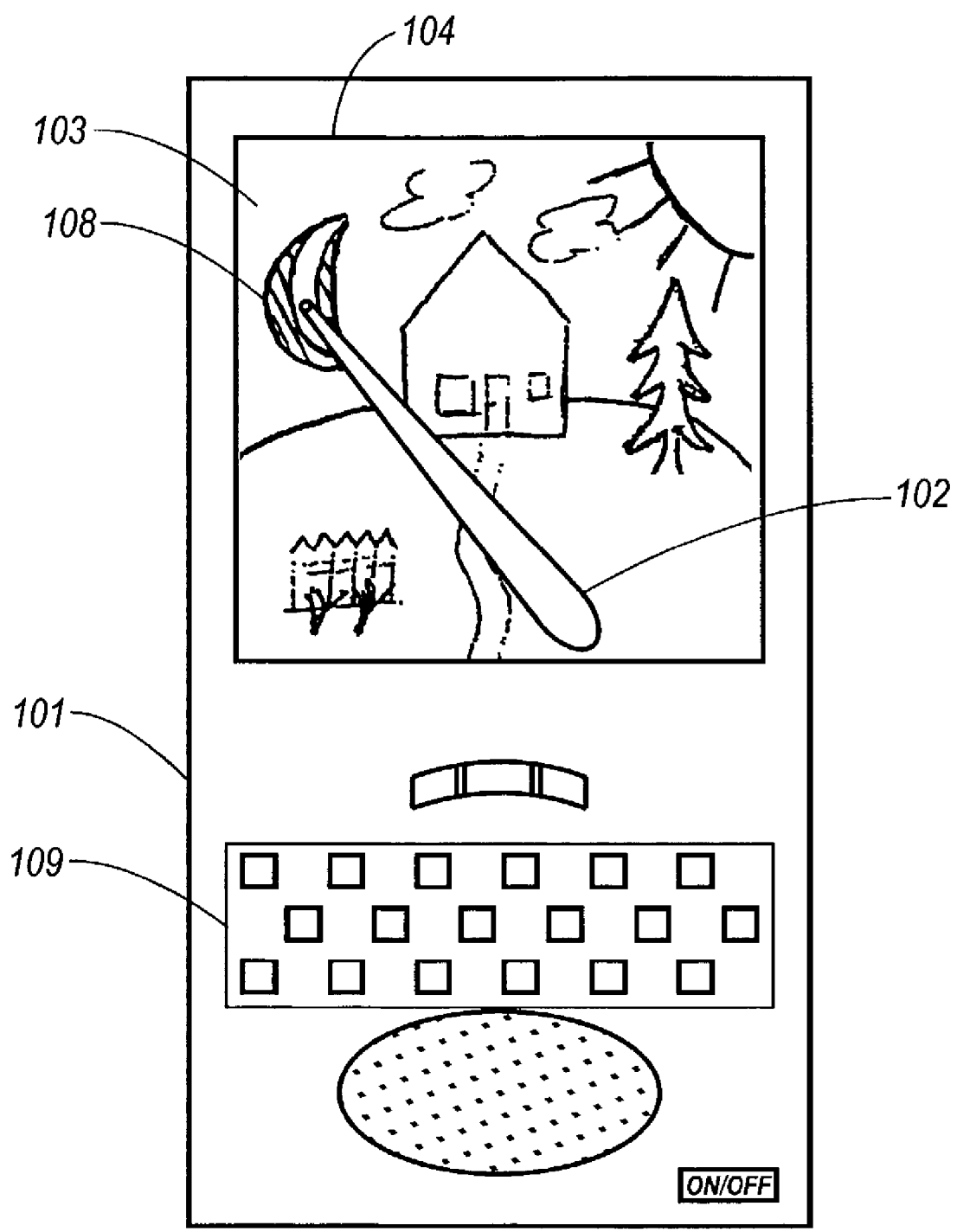
FIG. 5 shows an exemplary embodiment of a hyperlink target or active area made visibly distinct in an image map according to the invention.

When the image map 103 shown in FIG. 3, for example, first appears, no hyperlink targets or active areas are highlighted. Thus, a user has no idea of where, or even whether, any hyperlink targets or active areas exist within the displayed image map 103. Therefore, a user must make a gesture, for example, by touching the stylus 102 somewhere within the image map 103 displayed on the display screen 104. As shown in FIG. 5, this gesture locates and/or identifies one or more hyperlink targets or active areas by displaying one or more of the hyperlink targets or active areas in a visibly distinguished manner, such as, for example, by highlighting, or otherwise altering the visual appearance, of one of the hyperlink targets or active areas, such as the hyperlink target or active area 108. By highlighting the hyperlink targets or active areas, the system enables the user to distinguish the available hyperlink targets or active areas displayed in the image map 103 from the other, non-active graphical images displayed within the displayed image map 103. Thus, by performing a single gesture, for example, by touching the stylus 102, to the image map 103 on the display screen 104 a user immediately locates and/or identifies one or more of the hyperlink targets or active areas not previously visibly distinguishable in the displayed image map 103.

Figure 6:
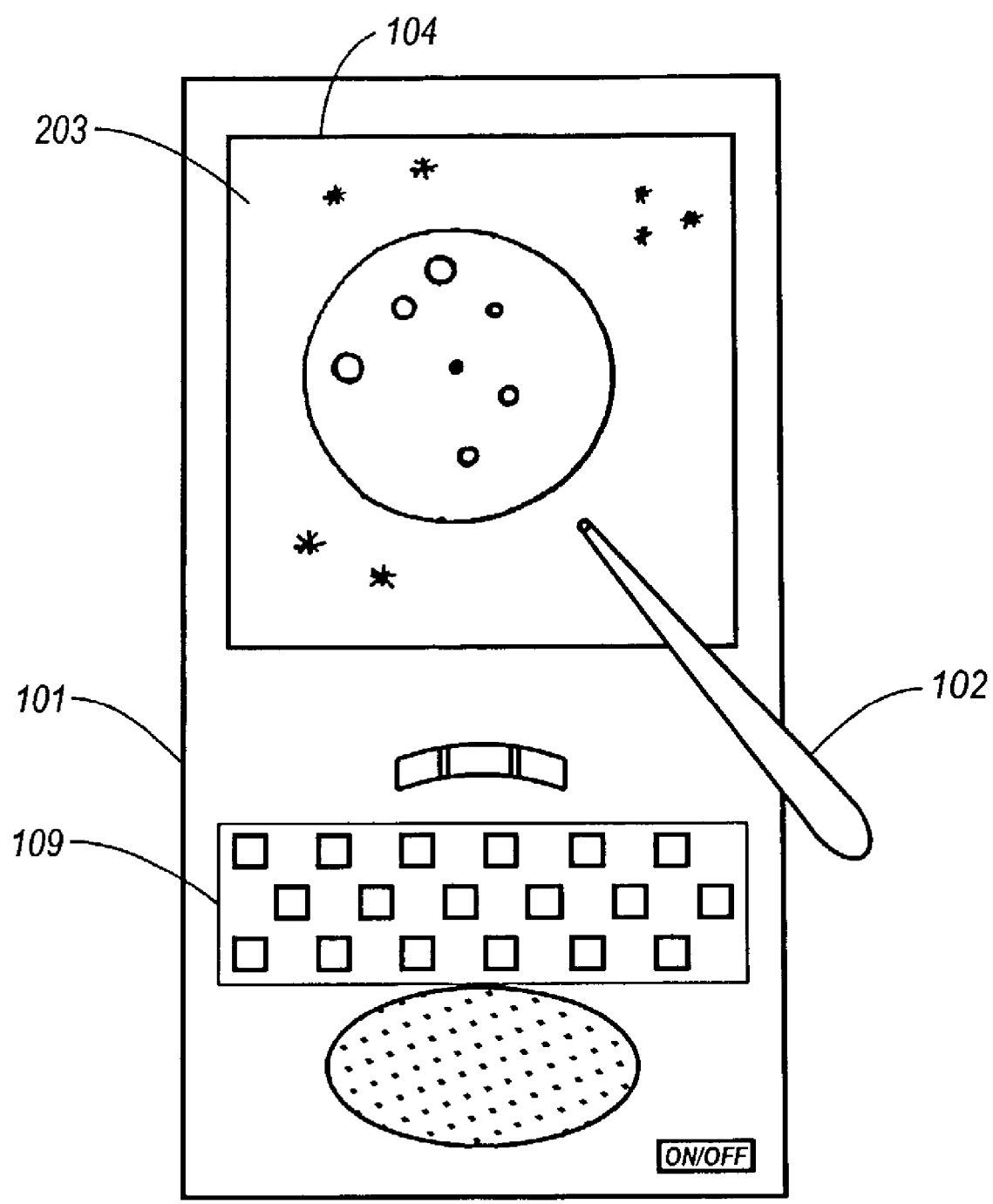
FIG. 6 shows the information retrieved from the exemplary visibly distinct hyperlink target or active area in the image map shown in FIG. 5 according to the invention.

Thereafter, the user may perform a gesture to select a desired one of the highlighted hyperlink targets or active areas, such as, for example, the hyperlink target or active area 108. This second gesture upon the desired hyperlink target or active area, such as, for example, the hyperlink target or active area 108, could result in a new image map 203 being displayed, as shown in FIG. 6. Of course, it should be appreciated that the new image map 203 may have one or more additional hyperlink targets or active areas that a user could further identify, locate and select as desired using the same methods as described above.

The highlighting or altering of the visual appearance of the one or more hyperlink targets or active areas, such as, for example, the hyperlink target of active area 108 shown in FIG. 5, lasts for a designated time period. In various exemplary embodiments, the designated time period may be, for example, two seconds. After the designated time period expires, the highlighting of the one or more hyperlink targets or active areas would be automatically removed from the displayed image map 103 without any additional gestures or inputs by the user.

Removing the highlighting of the one or more hyperlink targets or active areas may occur immediately upon the expiration of the designated time period. Alternatively, the highlighting of the one or more hyperlink targets or active areas may be removed gradually. For example, in various exemplary embodiments, the highlighting of the hyperlink target or active area may "fade away" gradually, beginning when the hyperlink target or active area is initially highlighted and ending upon the expiration of the designated time period. In various other exemplary embodiments, the highlighting of the one or more hyperlink targets or active areas is removed in response to a desired hyperlink target or active area being selected. As a result, in either case, the displayed image map 103 remains uncluttered and easier for a user to interact with.

Figure 7:
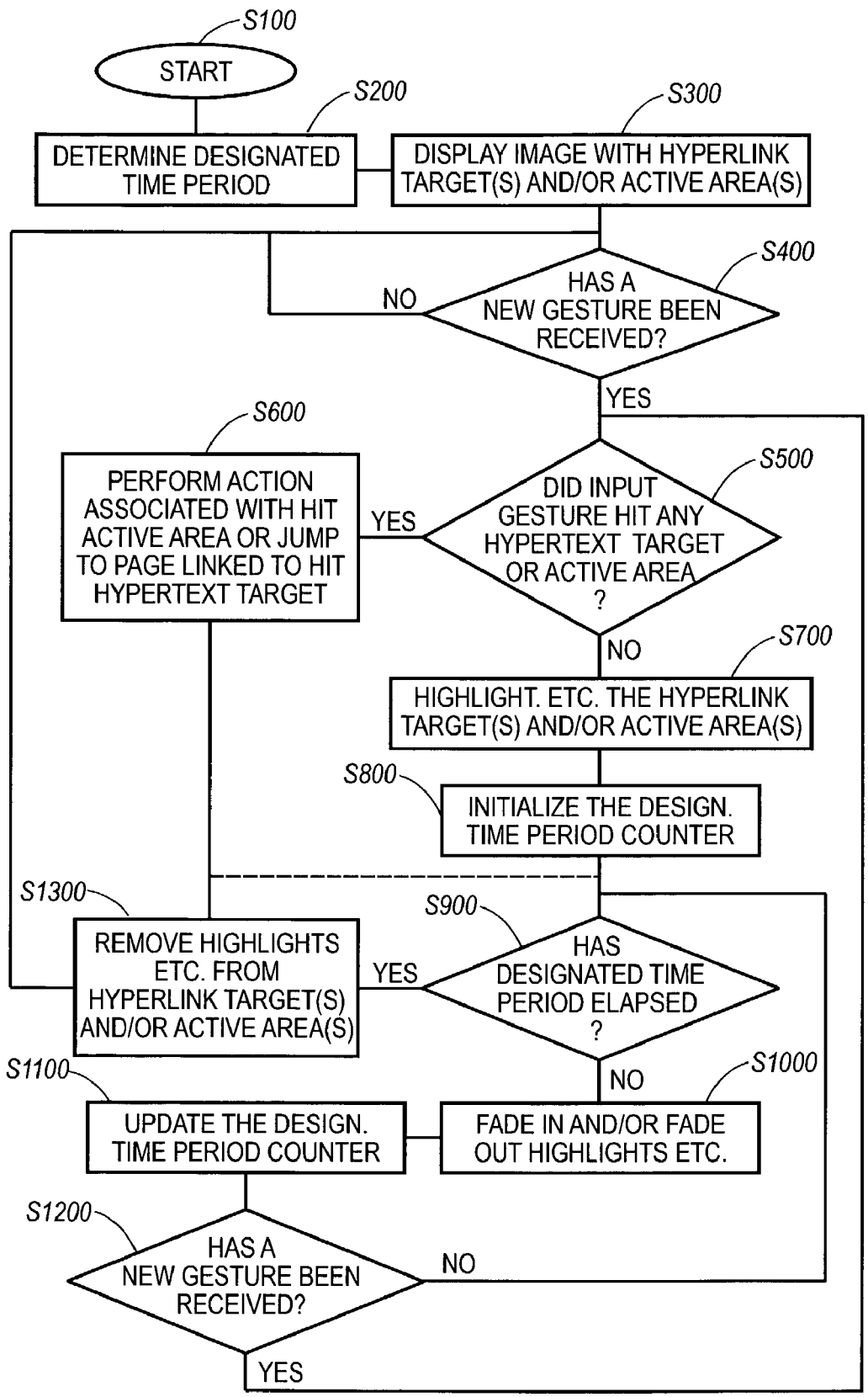
FIG. 7 is a flowchart outlining one exemplary embodiment of a method for locating hyperlink targets or active areas within an image map in a handheld device according to the invention.

FIG. 7 is a flowchart outlining one exemplary embodiment of a method for locating and/or identifying hyperlink targets or active areas according to this invention. As shown in FIG. 7, beginning in step S100, operation continues to step S200, where the predetermined time period for highlighting the hyperlink targets or active areas is set to, for example, two seconds. Thereafter, in step S300, the image map 103 with hyperlink targets and/or active areas is shown. Then, in step S400, a determination is made whether the user has input a gesture, such as, for example, touching the stylus 102 within the image map 103 displayed on the display screen 104 to identify and/or locate the hyperlink targets or active areas within the displayed image map 103. If such a gesture has been input, operation then continues to step S500. Otherwise, operation returns to step S400.

It should be appreciated that, in step S200, in various exemplary embodiments, the designated time period is determined based on preset user preference data that the user has provided to identify the user's preferred duration for the designated time period. Alternatively, in other exemplary embodiments, the designated time period is determined based on an initial value, or a current value that has been dynamically determined, that is usable when dynamically adjusting the designated time period. Of course, if the designated time period is predetermined or fixed, step S200 can be skipped or omitted.

In step S500, a determination is made whether the input gesture "hit" any of the active areas or hyperlink targets or "missed" all of the active areas or hyperlink targets on the displayed image map. If an active area or hyperlink target was hit, operation continues to step S600. Otherwise, the input gesture "missed" all of the hyperlink targets or active areas in the displayed image map. Operation thus jumps to step S700.

In step S600, the "hit" hyperlink target or active area is selected or activated. In response, any action associated with the active area is performed or the page to which the selected hyperlink target is linked is displayed. Operation then jumps to step S1300.

In step S700, one or more active areas and/or hyperlink targets are highlighted or otherwise visibly distinguished within the displayed image map (and/or audibly, tactilely and/or olfactorily located or identified) to identify those active areas and/or hyperlink targets to the user. Next, in step S800, the time period counter is initialized with the designated time period. Then, in step S900, a determination is made whether the designated time period has elapsed. If so, operation jumps to step S1300. Otherwise, if the predetermined time period has not elapsed, operation continues to step S1000.

In step S1000, if implemented, the altered visual appearance or highlighting (and/or the audible, tactile and/or olfactory output presented to the user) is itself altered, based on the amount of the designated time period that has elapsed, to fade in and/or to fade out the highlighting or other altered visual appearance (and/or the audible, tactile and/or olfactory output presented to the user). Of course, it should be appreciated that, if neither the "fade in" feature nor the "fade out" feature are used, step S100 can be omitted. In this case, operation jumps directly from step S900 to step S1100.

In step S1100, the time period counter is updated to reflect the elapsed time since the last "miss" gesture was received from the user. Then, in step S1200, a determination is made whether a new gesture has been received from the user. If so, operation jumps back to step S500 to determine if the new gesture received from the user is a "hit" gesture or a "miss" gesture". Otherwise, if no new gesture has been received from the user, operation jumps back to step S900.

In step S1300, because the designated time period has elapsed, or because the user has selected a hyperlink target or activated an active area before the designated time period elapsed, the highlighting or other altered visual appearance of the one or more active areas or hyperlink targets (and/or the audible, tactile and/or olfactory output presented to the user) is removed. Operation then returns to step S400.

Figure 17:
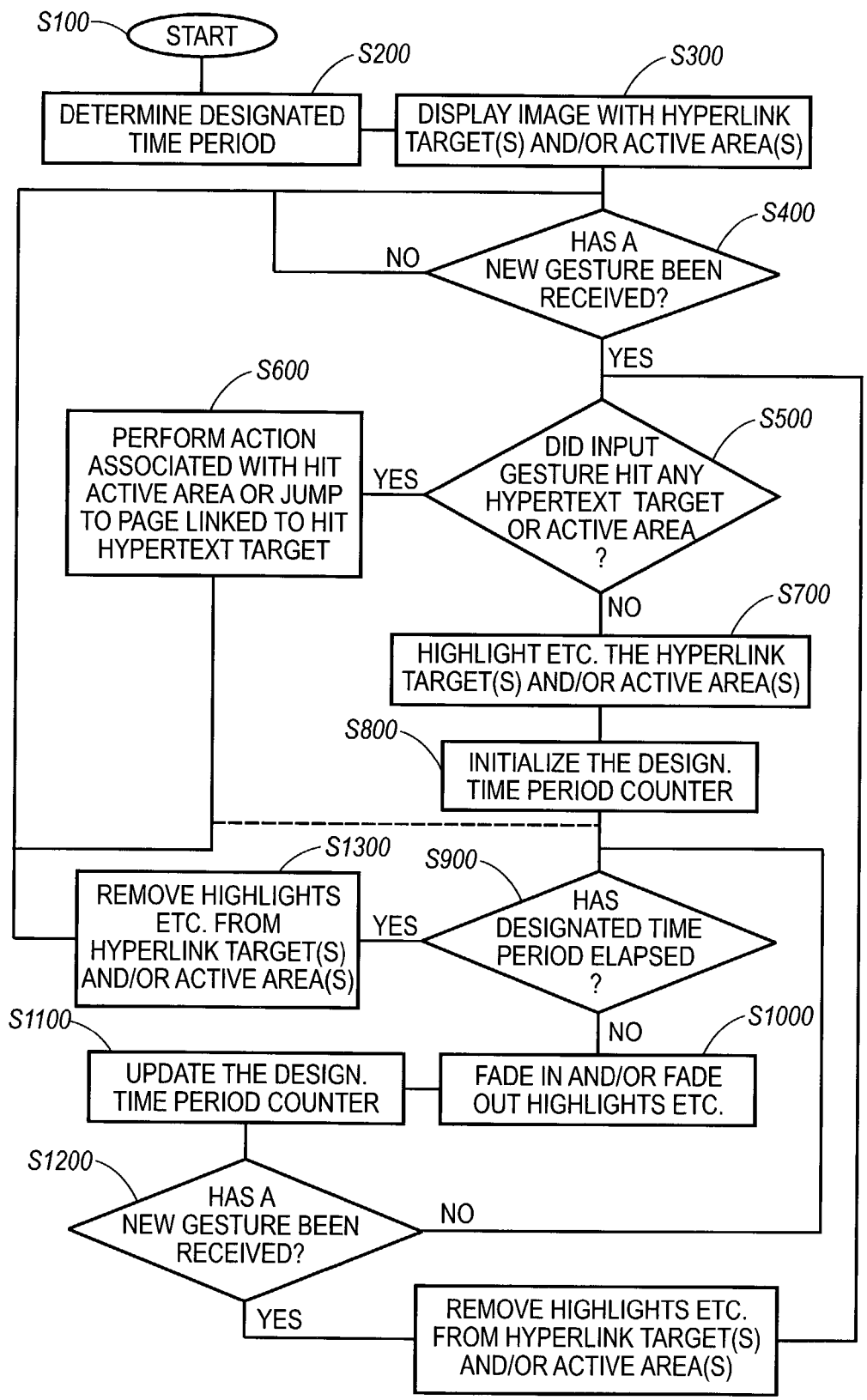
FIG. 17 is a flowchart outlining a second exemplary embodiment of a method for locating hyperlink targets or active areas within an image map in a handheld device according to the invention.

It should be appreciated that the method of FIG. 7 can be modified as shown in FIG. 17.

It should be appreciated that, in the exemplary embodiment outlined above, once the user has selected a hyperlink target or activated an active area before the designated time period elapsed, as described relative to step S600, the highlighting or other altered visual appearance of the one or more active areas or hyperlink targets (and/or the audible, tactile and/or olfactory output presented to the user) is automatically removed in step S1300. However, in various other exemplary embodiments, in step S600, rather than jumping directly to S1300 after the user has selected a hyperlink target or activated an active area before the designated time period elapsed, operation jumps instead to step S900. In this case, even after the user has selected a hyperlink target or activated an active area before the designated time period has elapsed, the highlighting or other altered visual appearance of the one or more active areas or hyperlink targets (and/or the audible, tactile and/or olfactory output presented to the user) is not removed until the designated time period has elapsed.

It should also be appreciated that step S200, rather than being performed between steps S100 and S300, can instead be performed between steps S700 and S800. This is especially useful when the user can change the designated time period, for example, by changing a preference value, or when the designated time period is dynamically determined based on the user's actions.

Figure 8:
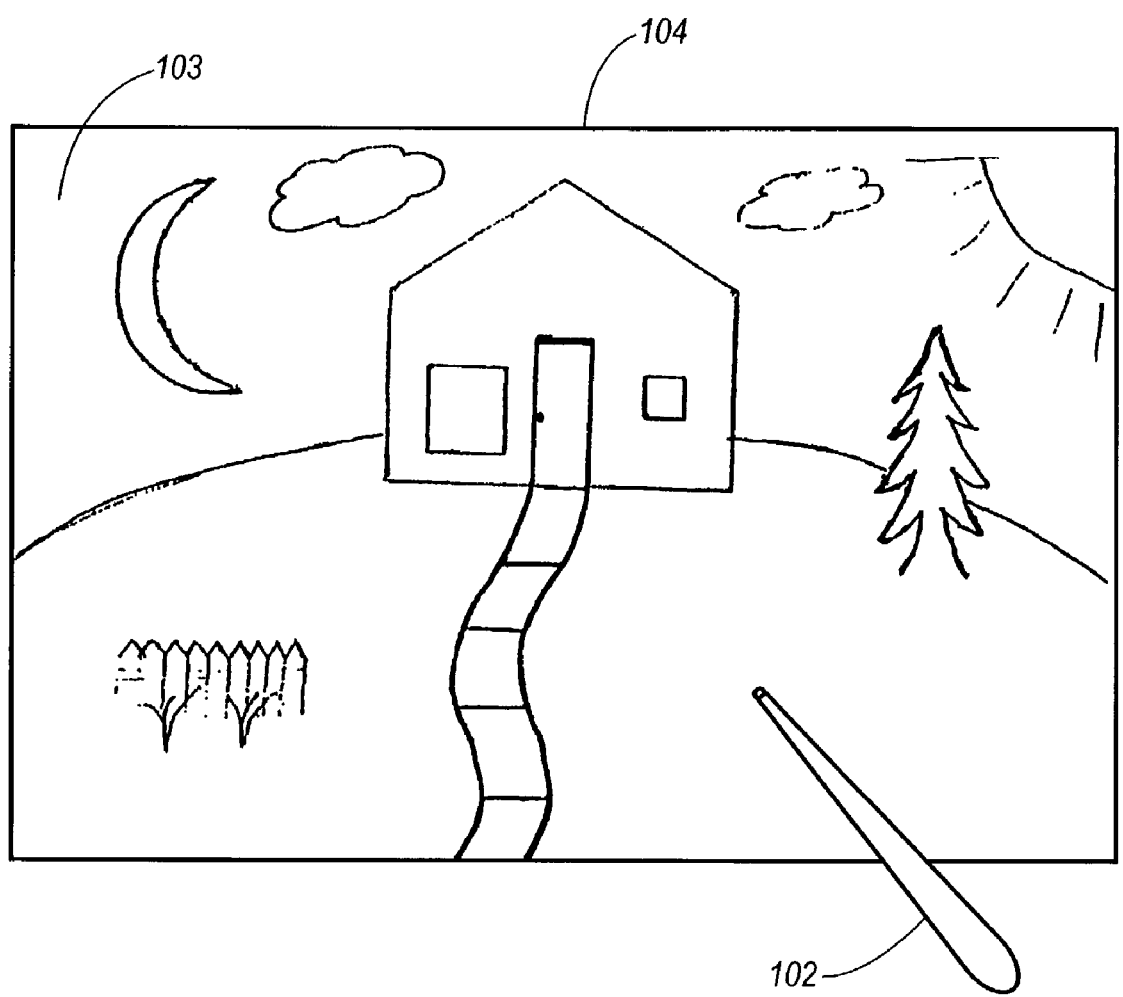
FIG. 8 shows an image map having hyperlink targets or active areas to be located and/or identified by touching or positioning of a stylus or other instrument within an image map according to the invention.
Figure 9:
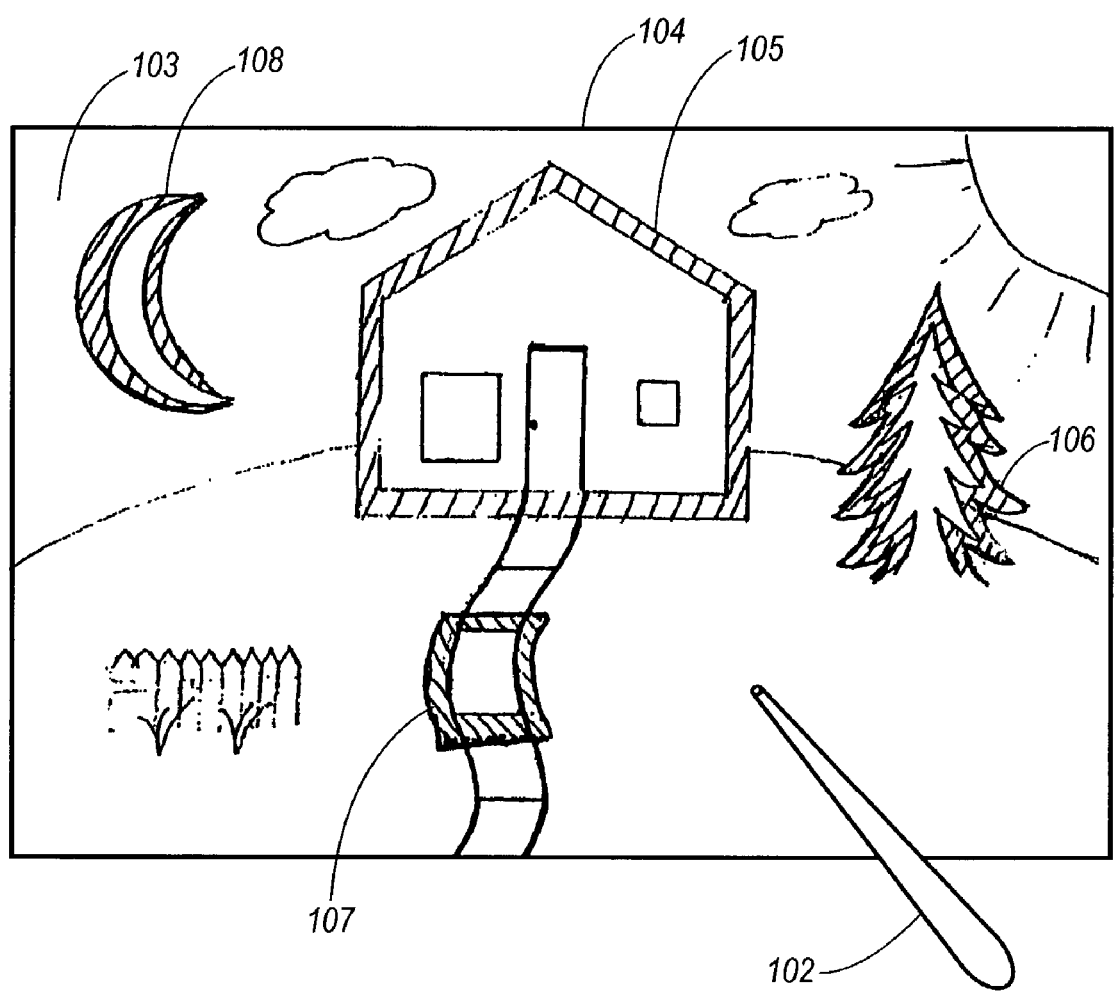
FIG. 9 shows exemplary hyperlink targets or active areas made visibly distinct within an image map by a single gesture of the stylus or other instrument to the image map according to a first exemplary embodiment of the systems and methods according to this invention.

FIG. 8 shows the display screen 104 and the displayed image map 103 of the hand held device 100. As shown in FIG. 9, in response to the initial user gesture of touching the stylus 102 against an area of the image map 103 that is not within the bounds of any hyperlink target or active area of the displayed image map 103, all of the hyperlink targets or active areas 105–108 within the image map 103 are highlighted, or otherwise made visibly distinct. By highlighting, or otherwise visibly distinguishing, the hyperlink targets or active areas 105–108 in the image map 103, the user is provided with directional guidance.

As indicated above, highlighting, or visibly distinguishing, the hyperlink targets or active areas 105–108 ends after a designated time period, such as, for example, two seconds, has elapsed. The highlighting is removed from the hyperlink targets or active areas automatically in response to either the designated time period expiring and, in various exemplary embodiments, additionally by the user selecting one of the hyperlink targets or active areas 105–108. Additionally, within the designated time period, the highlighting may be gradually removed, for example, by fading out the highlighting of the one or more hyperlink targets or active areas such that the highlighting is completely removed by the time the designated time period has elapsed. As a result, the display screen 104 and image map 103 remain uncluttered permitting one or more of the various hyperlink targets or active areas to be efficiently located and/or identified. Further, no additional gesture by the user is required to remove the highlighting from the hyperlink targets or active areas 105–108.

It should be appreciated the hyperlink targets or active areas may be highlighted, or made visibly distinguishable using any appropriate known or later developed technique, such as, for example, outlining, color change, appearance distortion, changing to a three-dimensional appearance, animation, addition of drop-shadows, or the like. These techniques need not indicate the location of the hyperlink target or active area in a manner that reflects its exact shape. For example, line segments may be used to connect the point of contact between the stylus and the touch screen with the perimeter, center or centroid of the hyperlink targets or active areas. As another example, the center or centroid of the hyperlink targets or active areas may be indicated using glyphs.

Further, it should be appreciated that while in the above described exemplary embodiments all of the hyperlink targets or active areas 105–108, for example, in FIG. 9, are highlighted or otherwise visibly distinct as a result of the user gesture of touching the stylus or other instrument 102 to the display screen 104, not all of the hyperlink targets or active areas need to appear highlighted, or otherwise made visibly distinct, as a result of such a user gesture.

Figure 10:
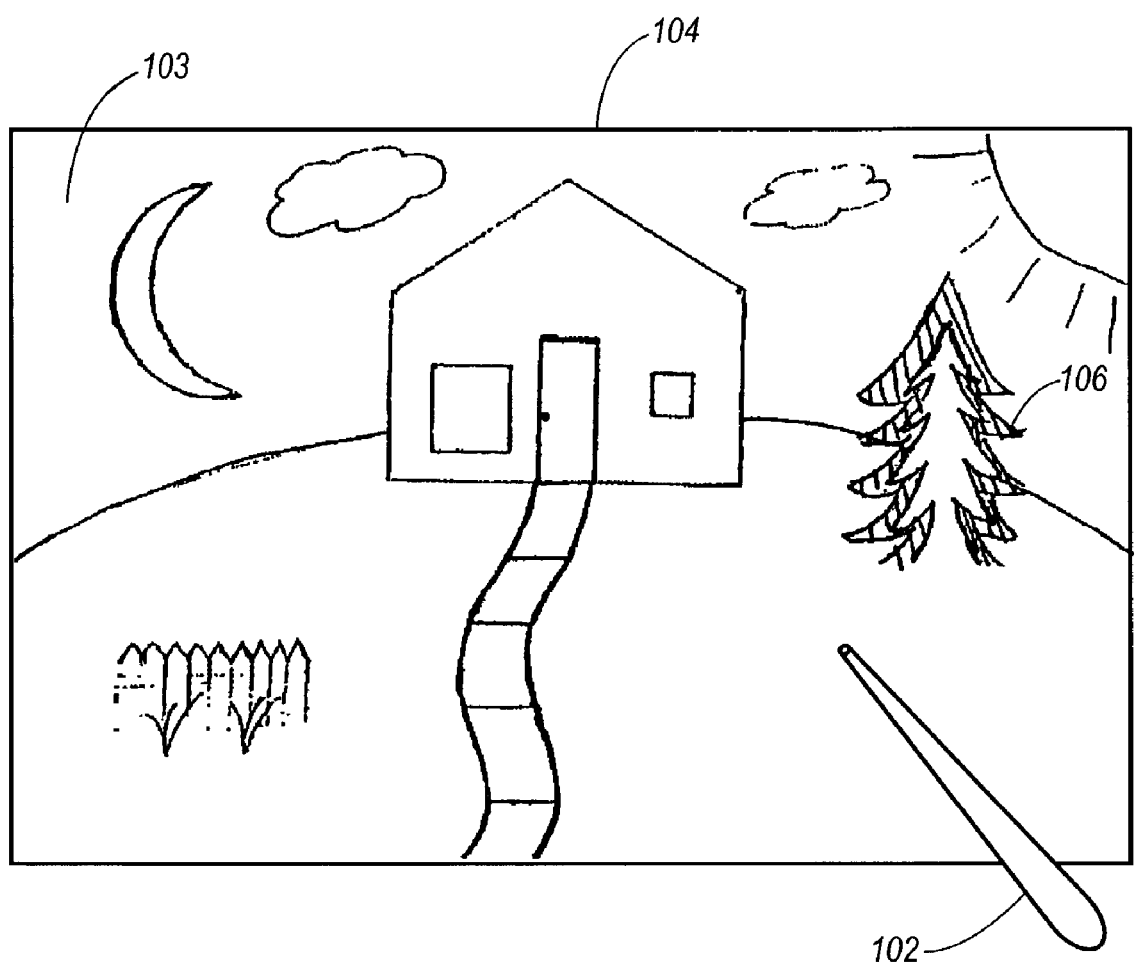
FIG. 10 shows an exemplary embodiment of only the n hyperlink targets or active areas made visibly distinct corresponding to the position of the stylus or other instrument on the image map according to a second exemplary embodiment of the systems and methods according to this invention.

FIG. 10 shows a second exemplary embodiment in which only a predetermined number n of the hyperlink targets or active areas, that are closest to the position of the gesture on the image map 103, are highlighted, or otherwise made visibly distinguishable, in correspondence with the position of the stylus 102 on the displayed image map 103. In the example illustrated in FIG. 10, the number n is set to one. Therefore only the hyperlink target or active area 106 is shown as highlighted. It should be appreciated, however, that the number n may be set to any positive whole number so that that number n of hyperlink targets or active areas corresponding to the position of the stylus 102 within the displayed image map 103 are highlighted. It should further be appreciated that the number n of hyperlink targets or active areas may be dynamically adjusted to improve the ability of the user to discern the hyperlink targets or active areas. For example, in various exemplary embodiments, the number n of hyperlink targets or active areas is dynamically determined to avoid the display becoming overly cluttered.

Figure 11:
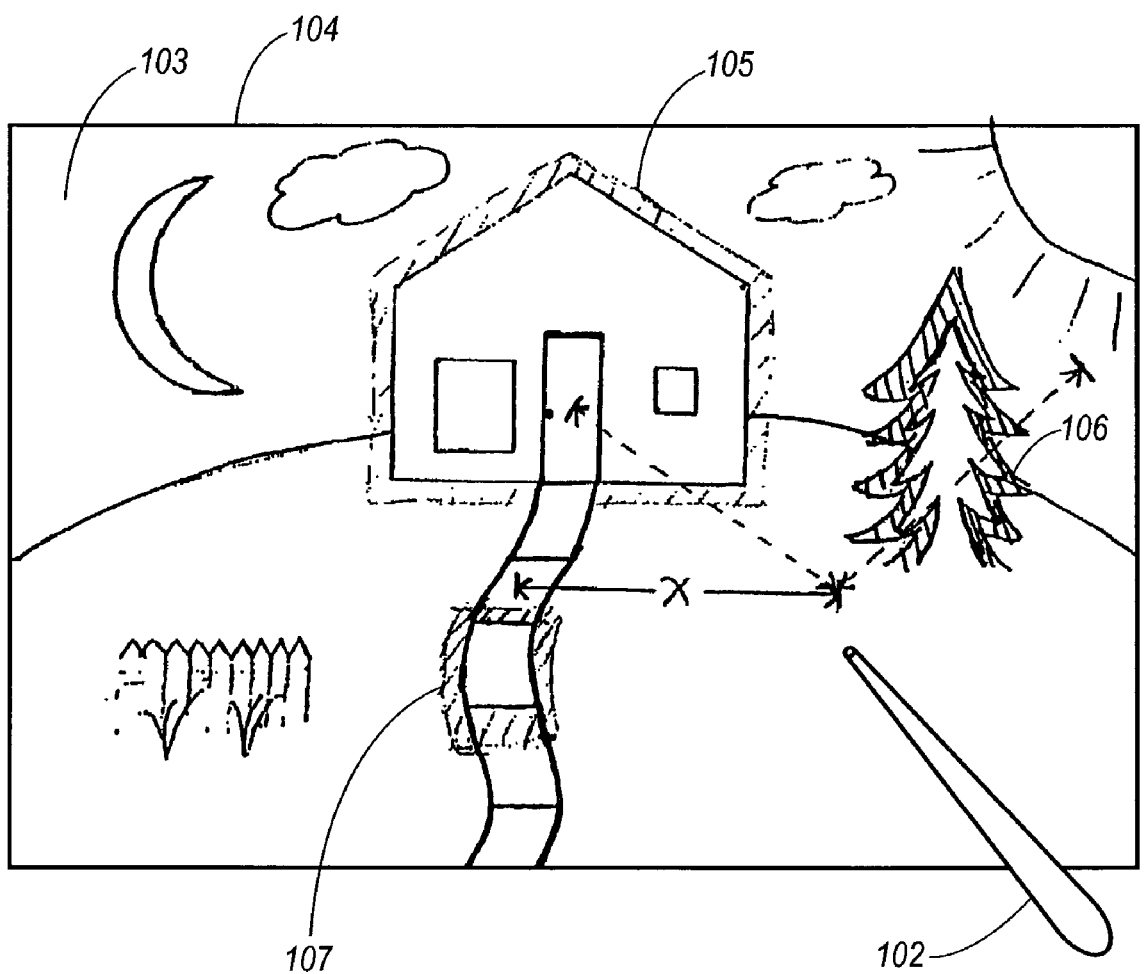
FIG. 11 shows the highlighting of hyperlink targets or active areas within a proximity range distance x corresponding to the position of the stylus relative to the various hyperlink targets or active areas according to a third exemplary embodiment of the systems and methods according to this invention.

FIG. 11 shows a third exemplary embodiment in which the highlighting of hyperlink targets or active areas corresponds to a predetermined proximity range distance corresponding to the position of the stylus 102 relative to the various hyperlink targets or active areas within a displayed image map 103. In the example illustrated in FIG. 11, the proximity range is set such that only those hyperlink targets or active areas 105–107 within a distance x from the position of the stylus 102 are highlighted. Of course, it should be appreciated that the proximity range distance x may be set so that the distance x may be lesser or greater than that shown. As a result, fewer or more hyperlink targets or active areas may be highlighted according to the proximity range distance x selected. It should further be appreciated that the number of hyperlink targets or active areas displayed may be dynamically adjusted to improve the ability of the user to discern the hyperlink targets or active areas. For example, in various exemplary embodiments, the number n of hyperlink targets or active areas is dynamically determined to avoid the display becoming overly cluttered.

Figure 12:
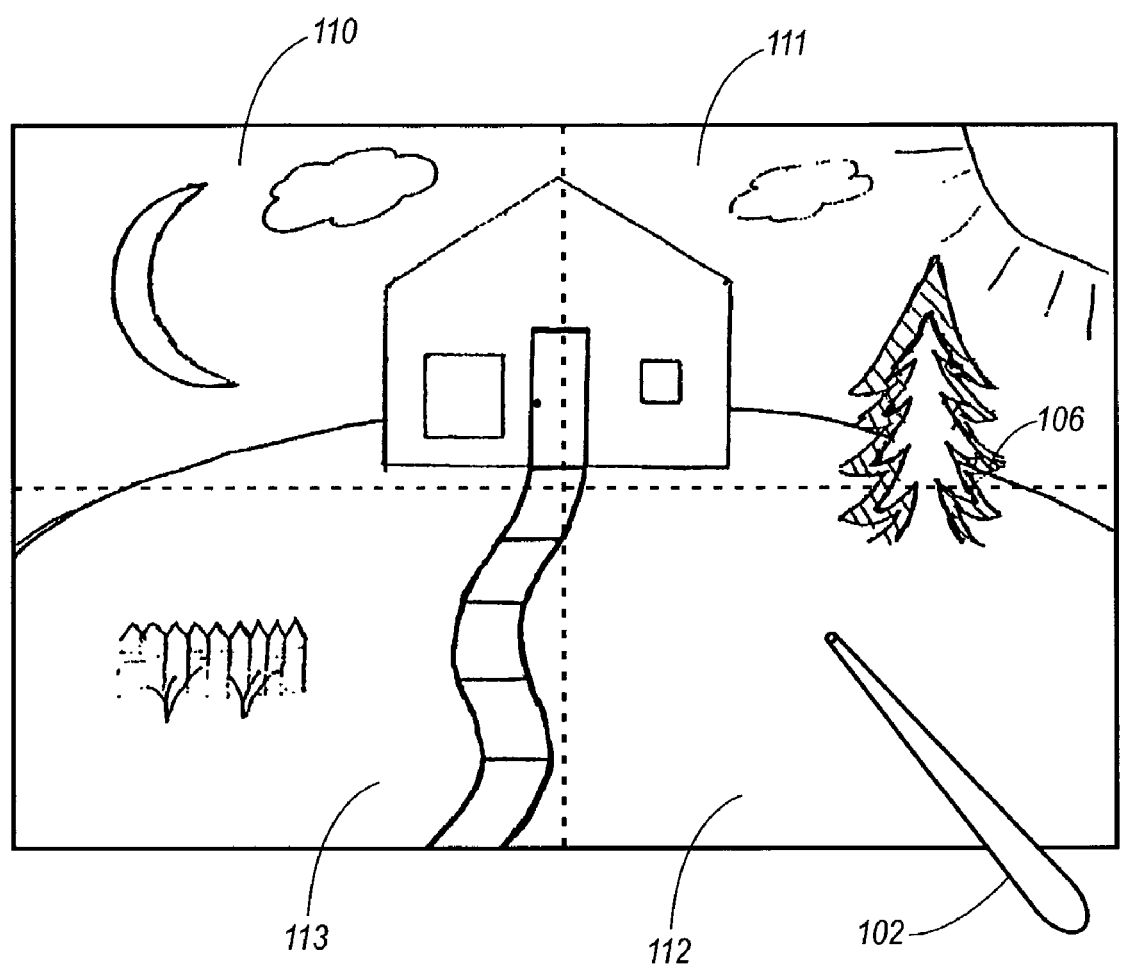
FIG. 12 shows the hyperlink targets or active areas made visibly distinct only within a same quadrant as the user gesture's positioning of the stylus or other instrument to the image map according to a fourth exemplary embodiment of the systems and methods according to this invention.

A fourth exemplary embodiment of the invention is shown in FIG. 12. FIG. 12 shows the image map 103 divided into approximately equal quadrants 110–113. The user gesture positioning the stylus or other instrument 102 in the quadrant 112, for example, results in only those hyperlink targets or active areas extending into that quadrant 112 being highlighted, or otherwise made visibly distinct. For example, only the active area 106 in FIG. 12 extends into the quadrant 112. At the same time, the user has made a "miss" gesture in the quadrant 112. As a result, only the hyperlink target or active area 106 is highlighted, or otherwise made visibly distinct. Again, as in various other exemplary embodiments, highlighting, or visibly distinguishing the hyperlink targets or active areas 105–108 will automatically end upon the designated time period expiring or, in various exemplary embodiments, upon one of the hyperlink targets or active areas being selected.

Additionally, the highlighting of the hyperlink targets or active areas may be removed gradually such that the highlighting fades out completely after the designated time period has expired without requiring any additional user gesture. Thus, again the efficiency of identifying, locating and/or selecting a hyperlink target or active area is increased. Of course, should the highlighting, or other visible distinction, of the hyperlink targets or active areas be removed from display as a result of the expiration of the designated time period before the user has successfully identified, located and/or selected the desired hyperlink target or active area, then the user may simply repeat the appropriate gesture, such as, for example, touching the stylus 102 to the displayed image map 103 again to highlight the various hyperlink targets or active areas again.

Figure 13:
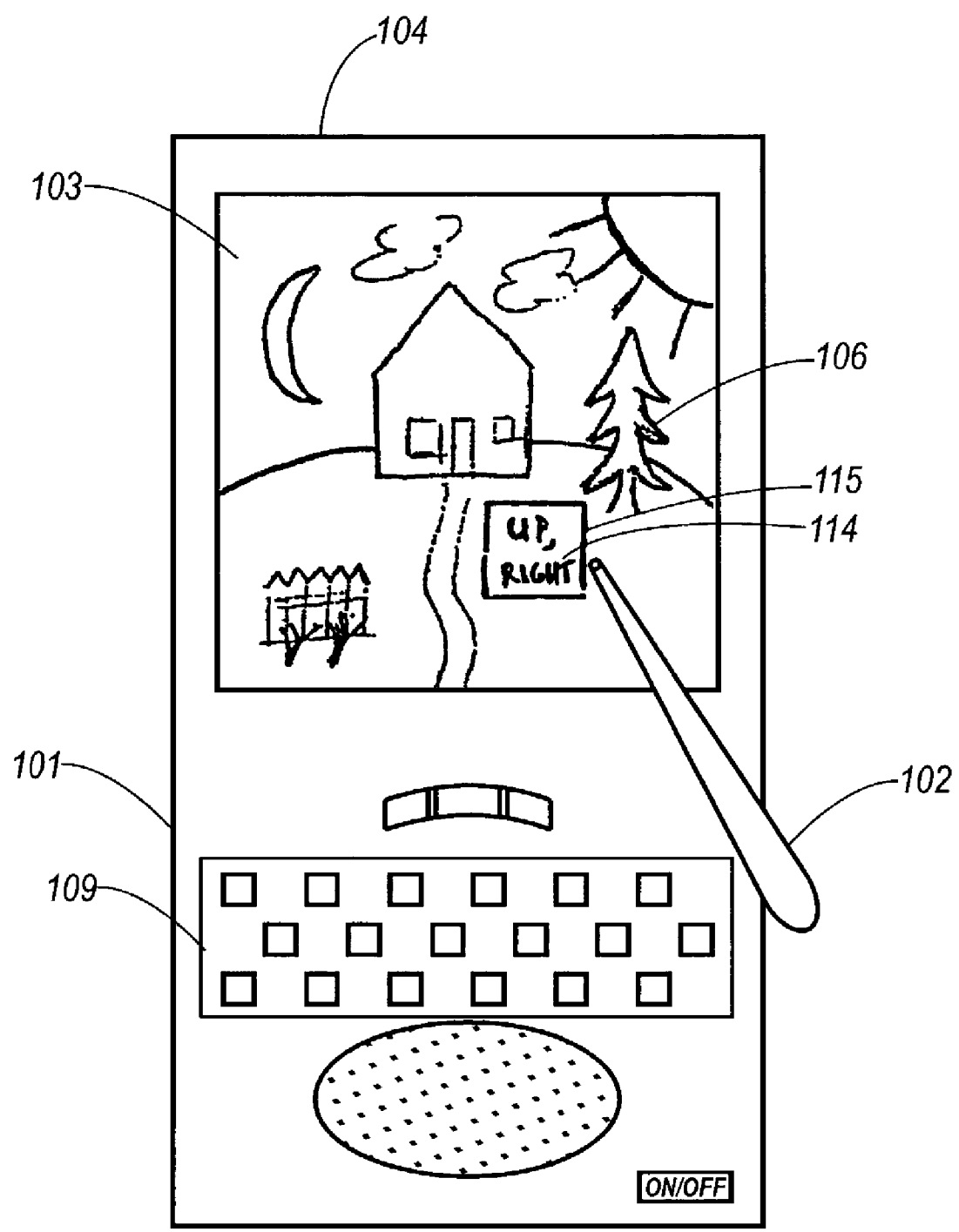
FIG. 13 shows an exemplary pop-up text window with textual directional tips according to a fifth embodiment of the systems and methods according to this invention.

FIG. 13 shows a fifth exemplary embodiment of the invention, wherein some express directional tip 114 to guide a user to a desired hyperlink target or active area may be provided as a result of the user's gesture of touching the stylus 102 to the displayed image map 103. For example, when the user's gesture positions the stylus 102 in contact with the displayed image map 103, directional tips 114 in a pop-up text window 115 could appear to help a user to locate, identify and/or select, for example, the nearby active area 106. This is particularly useful when the image map 103 as displayed is bigger than the display 104, such that the user would need to pan or scroll the image map relative to the display 104. In this situation, one or more of the active areas or hyperlink targets highlighted in response to a "miss" gesture may not appear on the portion of the image map 103 visible in the display 104. This exemplary embodiment is especially useful in identifying such active areas or hyperlink targets.

FIG. 13 shows an exemplary pop-up window 115 that provides textual directional tips 114, such as, for example, "up, right" indicating to a user that the nearby hyperlink target or active area 106 is "up" and "to the right" of the position at which the stylus 102 was placed within the displayed image map 103 by the user. Similarly to the previously described embodiments, the pop-up text window 115 provided with directional tips 114 is displayed for a designated time period, for example, two seconds. After the designated time period has expired, the pop-up text window 115 and directional tips 114 are automatically removed from the display screen without any additional gesture or input by the user. The removal of the pop-up text window 115 and directional tips 114 may occur immediately when the designated time period has expired.

Additionally, the pop-up text window 115 and directional tips 114 may be removed gradually after the designated time period has expired such that the pop-up text window 115 and directional tips 114 fade out completely when the designated time period has elapsed. Alternatively, as in previous embodiments, the pop-up text window 115 and directional tips 114 may be removed from the display automatically by the user's selection of a desired hyperlink target or active area. Also as in the earlier described embodiments, if a user does not successfully locate, identify, and/or select the desired hyperlink target or active area within the designated time period allotted, the user may repeat the gesture touching the stylus 102 to the displayed image map to display the pop-up text windows 115 and directional tips 114 for a renewed predetermined time period.

As a result of automatically removing the pop-up text window 115 and directional tips 114 upon the designated time period expiring or upon a desired hyperlink target or active area being selected, the displayed image map 103 remains free of pop-up text windows or directional tips that would otherwise unnecessarily clutter the image map 103. Thus, the efficiency of identifying, locating and/or selecting a desired hyperlink target or active area is increased.

Figure 14:
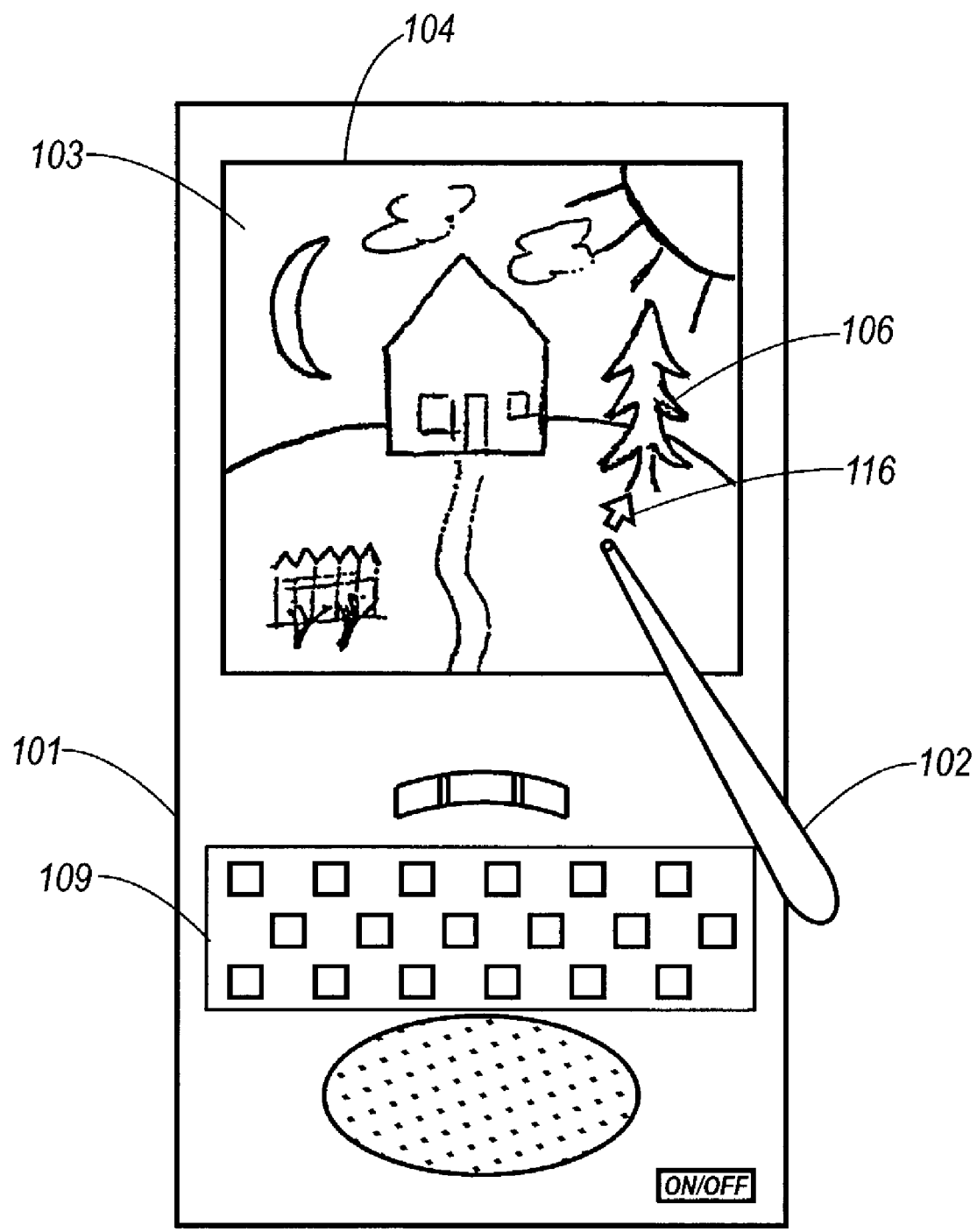
FIG. 14 shows an exemplary directional indicator according to a sixth embodiment of the systems and methods according to this invention.

FIG. 14 shows a sixth exemplary embodiment in which the pop-up text window 115 and text-based directional tips 114 of the fifth embodiment, as shown in FIG. 13, are replaced with, directional indicators 116, such as, for example, arrows, to direct or guide a user from the position of the stylus 102 on the displayed image map 103 to a desired hyperlink target or active area, such as, for example, hyperlink target or active area 106 as shown in FIG. 9.

Similarly to the display of the pop-up text window 115 and directional tips 114 in the fifth exemplary embodiment shown in FIG. 13, the sixth exemplary embodiment shown in FIG. 14 provides one or more arrow directional indicators 116 displayed on the image map 103 as the result of touching the stylus 102 to the image map 103. The display of the one or more arrow directional indicators 116 directs the user to hyperlink targets or active areas within the image map 103, for example, active area 106. The directional indicators 116 in the sixth exemplary embodiment are removed from the displayed image map 103 after a designated time period, for example, two seconds, has expired, similarly to that described in earlier embodiments. The directional indicators 116, therefore, may be removed from the displayed image map 103 automatically when the designated time period expires. Additionally, the directional indicators 116 may be removed gradually to fade out by the time the designated time period has expired. Further, the directional indicators 116 may be removed upon selecting a hyperlink target or active area. Thus, the same advantages of efficiently locating, identifying, and/or selecting a desired hyperlink target or active area are achieved.

It should be appreciated that in various exemplary embodiments of the invention, a combination of the pop-up text window 115 with text-based directional tips 114 and non-text directional indicators 116 could be provided simultaneously on the same displayed image map 103 to guide a user to a desired one of the various hyperlink targets or active areas within the displayed image map 103.

Figure 15:
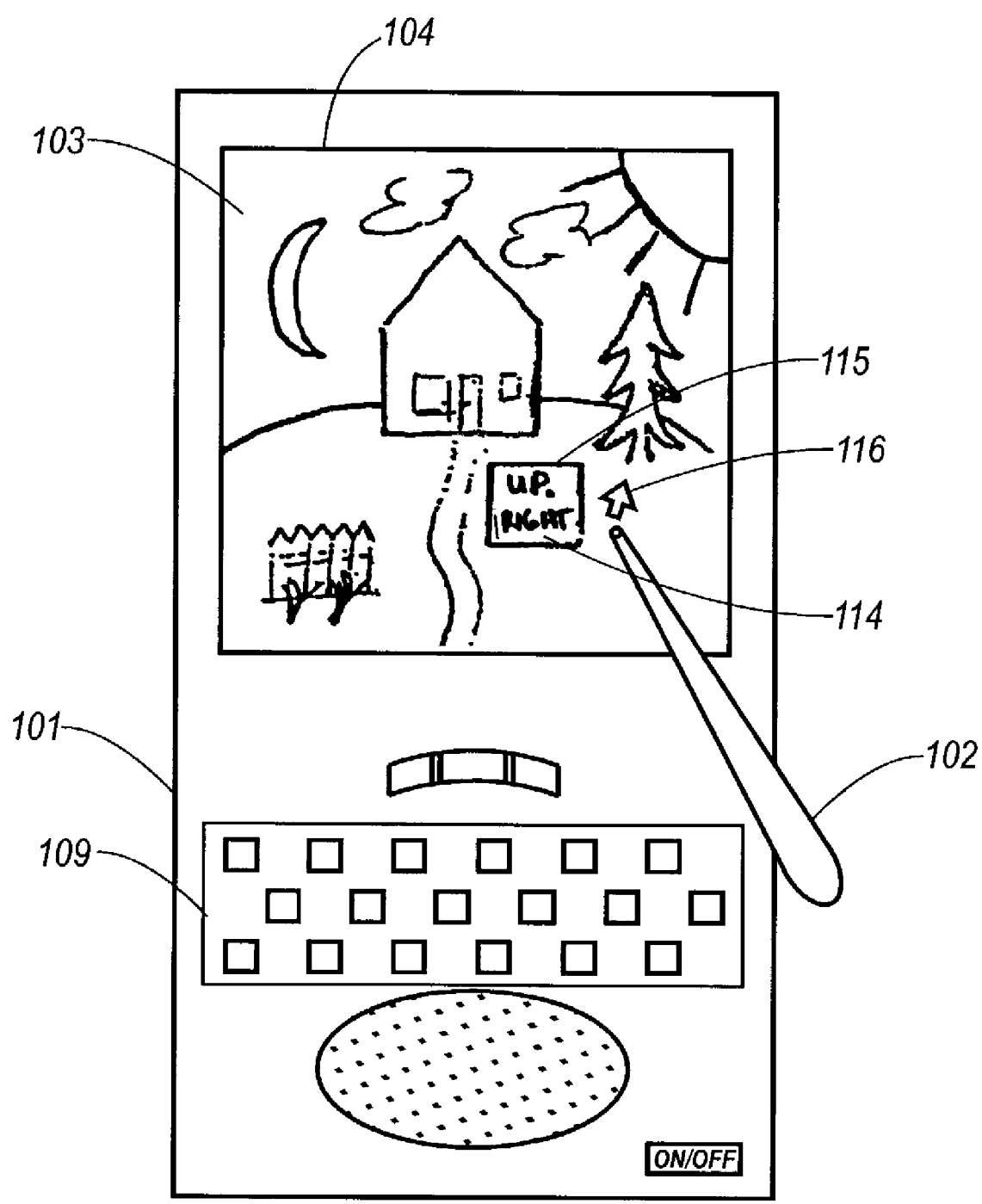
FIG. 15 shows a combination of an exemplary pop-up text window with textual directional tips and an exemplary directional indicator according to a seventh embodiment of the systems and methods according to this invention.

FIG. 15 shows a seventh exemplary embodiment of the invention in which the combination of pop-up text window 115 having text-based directional tips 114 and non-text directional indicators 116 are displayed simultaneously on the same image map 103 to guide a user to a desired hyperlink target or active area.

Figure 16:
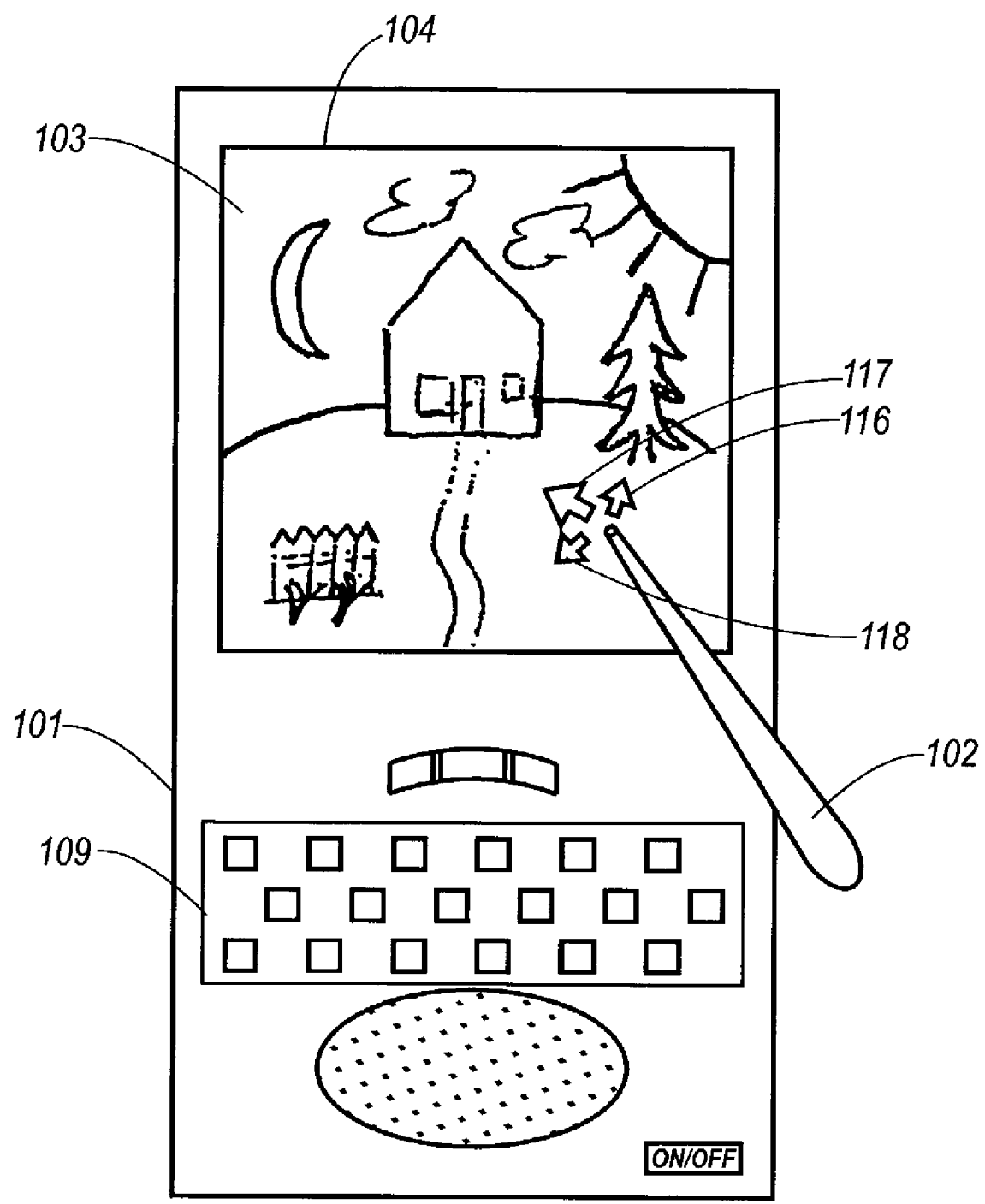
FIG. 16 shows a combination of multiple exemplary directional indicators according to an eighth embodiment of the systems and methods according to this invention.

FIG. 16 shows an eighth exemplary embodiment of the invention in which a combination of non-text directional indicators 116–118 are displayed simultaneously on the same image map 103 to guide a user to hyperlink targets or active areas. Non-text directional indicators 116–118 in FIG. 16 correspond to the nearest three hyperlink targets or active areas. It should be appreciated that the number of non-text directional indicators may be varied.

In all of the embodiments, it should be appreciated that either or both, as provided, of the pop-window 115 with text-based directional tips 114 and the non-text directional indicators 116–118 may be removed from the displayed image map 103 after the designated time period expires or upon selection of a hyperlink target or active area. As a result, the image map 103 is not cluttered with unnecessary images. Additionally, the removal of the pop-up text window 115 with text-based directional tips 114 and the non-text directional indicators 116–118 from the displayed image map 103 can occur gradually so that the pop-up text window 115 with text-based directional tips 114 and the non-text indicators 116, as provided, fade away after the designated time period has expired.

Likewise, in all of the exemplary embodiments discussed herein, as provided, the visibly distinct hyperlink targets or active areas may also be removed immediately upon the user's selection of a hyperlink target or active area. In either case, the advantages and efficiencies of locating, identifying, and/or selecting hyperlink targets or active areas in a non-cluttered environment are achieved.

It should be appreciated that various other exemplary embodiments of the invention provide other variations of the visibly distinguishing feature of the hyperlink targets or active areas within an image map to provide guidance to a user for locating, identifying, and/or selecting desired hyperlink targets or active areas within an image map.

It should be further appreciated that various other exemplary embodiments of the systems and methods according to this invention provide other variations of directional locational indicators of the hyperlink targets or active areas within an image map to provide guidance to a user in locating, identifying, and/or selecting desired hyperlink targets or active areas within an image map. In various exemplary embodiments, the locational indicators do not indicate the location of a specific hyperlink target or active area, but indicate the general location of one or more hyperlink targets or active areas. This is particularly useful when such hyperlink targets or active areas are off-screen, as suggested in the description of FIG. 13.

In various exemplary embodiments, an image map that can be panned in two dimensions is combined with locational indicators in the form of arrows along the edge of the image map that point in the cardinal directions of the display. When hyperlink targets or active areas lie off-screen, for example, at 80 degrees from the positive direction of a vertical axis, one or more arrows appears to indicate their general direction, for example, right. The arrows appear and disappear in accordance with previous descriptions of the invention.

In various other exemplary embodiments, an image map that can be scrolled using scroll bar controls is combined with locational indicators that change the appearance of the scroll bar controls. When hyperlink targets or active areas lie off-screen, for example, at 200 degrees from the positive direction of a vertical axis, the scroll bars change color in a gradient-based manner that indicates the general direction of the hyperlink targets or active areas, for example, down and to the left. The color changes appear and disappear in accordance with previous descriptions of the invention.

It should be further appreciated that, although the highlighting, or otherwise visibly distinguishing nature, of the hyperlink targets or active areas have thus far been described as visual distinctions, other distinctions may be used, such as, for example, audible, olfactory and/or tactile distinctions, to help a user identify, locate and/or select a desired hyperlink target or active area. The audible, olfactory, and/or tactile distinctions would terminate similarly as described in the various exemplary embodiments described above such that the removal of the distinguishing feature (audible, olfactory, tactile, and/or the like) would occur automatically after the designated time period has expired or upon selection of a desired hyperlink target or active area by a user.

It should further be appreciated that while the systems and methods according to this invention have thus far been described in terms of image maps and a touch-screen or pen-based user interface in which a cursor position is not continuously defined, the systems and methods according to this invention have additional applications beyond such interfaces that will be readily apparent to those skilled in the art. Various exemplary embodiments of the systems and methods according to this invention apply to conventional textual hypertext applications, such as textual World Wide Web pages, as well as in graphical hypertext applications, such as image maps.

World Wide Web browsers commonly allow users to select the desired appearance of textual hyperlink targets. Such hyperlink targets can be underlined at all times, underlined when the user "hovers" the cursor over a specific hyperlink target, or never underlined. The user can also commonly change the color of the textual hyperlink targets. A first exemplary problem is that turning off hyperlink targets or making them visible only on the cursor "hovering" over the hyperlink targets puts the user in a situation similar to that of an image map, in that there are no visible cues available to help the user locate the hyperlink target. A second exemplary problem occurs because Web page designers can make design choices that interact with user application preferences. The same color can be selected by the Web page designer for the Web page background and by the user for hyperlink targets, causing the textual hyperlink targets to "disappear" into the Web page background. A third exemplary problem is that it is possible for Web page designers to create pages that intentionally obscure the location of the hyperlink targets. Such Web page designs are useful if the user can "hover" the cursor over potential hyperlink targets to learn their location. Such page designs are not useful if the user cannot perform the "hover" operation.

In all of these exemplary problems, the system knows the location of all of the hyperlink targets but the user does not necessarily know these locations. That is, discovery of the hidden or obscured hyperlink targets is inconvenient even if the "hover" operation is supported by the hypertext system. The user can click speculatively on possible hyperlink targets. However, it would be useful if the system provided additional locational indicators. Therefore, various exemplary embodiments of the systems and methods according to this invention are applicable to conventional textual hypertext as well as to graphical hypertext based on image maps. Further, various exemplary embodiments of the systems and methods according to this invention apply to conventional graphical user interface systems using a cursor control device, such as a mouse, a joystick, a keyboard, a touch pad, a trackball, or the like in place of a touch-screen.

It should be appreciated that, in any of the various exemplary embodiments outlined above, the one or more locational indicators do not need to appear suddenly and/or do not need to appear at exactly the same time. In various exemplary embodiments, the one or more locational indicators "fade in" during an initial portion of the designated time period. In other exemplary embodiments, the one or more locational indicators appear serially during the initial portion of the designated time period. In various ones of such exemplary embodiments, the locational indicators closest to the point of contact between the stylus and the touch screen appearing first, although the one or more locational indicators could appear in any desired order.

Similarly, it should be appreciated that, in any of the various exemplary embodiments outlined above, the one or more locational indicators need not disappear suddenly and/or at exactly the same time. In various exemplary embodiments, the displayed one or more locational indicators begin "fading away" at some predetermined point within the designated time period, such that the one or more locational indicators fade out during a final portion of the designated time period. Of course, it should be appreciated that the final portion could be the entire designated time period. In further exemplary embodiments, the one or more locational indicators disappear serially. In various ones of such exemplary embodiments, the locational indicators closest to the point of contact between the stylus and the touch screen disappearing first, although the one or more locational indicators can disappear in any desired order.

As outlined above, in various exemplary embodiments, the one or more locational indicators fade out. In those exemplary embodiments where the one or more locational indicators also fade in during an initial portion of the designated time period, the one or more locational indicators will fade out during the final portion of the designated period. In various exemplary embodiments, there will be a middle portion of the designated time period before the final portion where the one or more locational indicators are shown fully faded in. Alternately, in various other exemplary embodiments, the final portion of the designated time period begins upon the one or more locational indicators becoming fully faded in, for example, immediately after the initial period ends.

As outlined above, in various exemplary embodiments, the one or more locational indicators appear serially in a manner outlined above during the initial portion of the designated time period. In those exemplary embodiments where the one or more locational indicators also disappear serially, each locational indicator may appear and disappear serially before the next locational indicator appears. Alternatively, each locational indicator may appear serially, with none of the one or more locational indicators disappearing until all of the one or more locational indicators have appeared. Then, either immediately, or alternatively after some middle portion of the designate time period, the one or more locational indicators begin serially disappearing as outlined above.

In various exemplary embodiments, the designated time period is fixed or predetermined, for example, at two seconds, prior to the systems and methods according to this invention being used to navigate within an image map. It should be appreciated that the designated time period can be any desired length. A fixed or predetermined time period is simple to implement and assures predictable behavior, an important quality in user interface design. In various other exemplary embodiments, the designated time period is determined using user preference settings. That is, the designated time period is changeable, but maintained at a particular value until and unless it is deliberately changed by the user. Time period adjustments based on user preferences are also simple to implement and can give the user more control over the behavior of the locational indicators. Such control is also an important quality in user interface design.

In yet other various exemplary embodiments, the designated time period is adaptively determined. For example, in some exemplary embodiments, the time periods is dynamically changed using automatic adjustments made in response to a given user's actions. An adaptive time period can be used to adjust to variations in the abilities of an individual user, such as variations in user response time and reflexes, relative to other users or relative to that user's previous abilities. It should be appreciated that any known or later-developed technique usable to dynamically adjust the designated time period can be used in the systems and methods according to this invention.

It should further be appreciated that, in various exemplary embodiments, the techniques used to determine how the designated time period is determined and/or the techniques for varying the designated time period (or allowing the designated time period to be changed) may be selected and/or altered depending on the particular image maps and corresponding images that the systems and methods of this invention are being used with and/or the needs of the particular user that is using the systems and methods according to this invention to interact with an image map.

While this invention has been described in conjunction with the exemplary embodiments outlined above, it is evident that many alternatives, modifications and variations may be apparent to those skilled in the art. Accordingly, the exemplary embodiments of the invention, as set forth above, are intended to be illustrative only, not limiting. Various changes may be made without departing from the spirit and scope of the invention.

What is claimed is:

1. An image displaying system, comprising:
   a graphical display device usable to display an image having at least one of at least one hyperlink target and at least one active area provided in the displayed image; and
   a user input device usable to locate, identify or select one of the at least one of at least one hyperlink target and at least one active area provided in the displayed image, wherein:
   in response only to a user inputting a first gesture made relative to the displayed image that does not correspond to any of the at least one of at least one hyperlink target and at least one active area, the image display system generates at least one human-sensable output that communicates a location indication to the user of at least one of at least one of at least one hyperlink target and at least one active area, and
   in response to at least a designated time period expiring, the image display system removes the at least one human-sensable output from the displayed image.

2. The image displaying device of claim 1, wherein the at least one human-sensable output is at least one of an altered visual appearance of at least one of the at least one of at least one hyperlink target and at least one active area, at least one locational indicator displayed on the image display device corresponding to at least one of the at least one of at least one hyperlink target and at least one active area, at least one audible output signal corresponding to at least one of the at least one of at least one hyperlink target and at least one active area, at least one tactile output signal corresponding to at least one of the at least one of at least one hyperlink target and at least one active area, and at least one olfactory output signal corresponding to at least one of the at least one of at least one hyperlink target and at least one active area.

3. The image displaying system of claim 2, wherein the altered visual appearance is at least one of highlighting, outlining, color changing, appearance distorting, animating, adding drop-shadows and glyphs, the altered visual appearance usable to distinguish at least one of the at least one of at least one hyperlink target and at least one active area.

4. The image display system of claim 2, wherein the at least one locational indicator is at least one of pop-up text windows, directional markers, and connecting line segments, the locational indicators usable to direct a user to at least one of the at least one of at least one hyperlink target and at least one active area.

5. The image displaying system of claim 1, wherein at least one of the at least one human-sensable output fades in gradually during an initial portion of the designated time period.

6. The image displaying system of claim 5, wherein at least one of the at least one human-sensable output, provided to the user in response to the first gesture, fades out gradually during a final portion of the designated time period.

7. The image displaying system of claim 6, wherein the at least one of the at least one human-sensable output that fades out gradually fades out such that the at least one human-sensable output reaches a fully-faded-out state synchronously with the designated time period expiring.

8. The image displaying system of claim 1, wherein at least one of the at least one human-sensable output, provided to the user in response to the first gesture, fades out gradually during a final portion of the designated time period.

9. The image displaying system of claim 8, wherein the at least one of the at least one human-sensable output that fades out gradually fades out such that the at least one human-sensable output reaches a fully-faded-out state synchronously with the designated time period expiring.

10. The image displaying system of claim 1, wherein the designated time period is at least one of a predetermined time period, a user selectable time period and a dynamically adjustable time period.

11. The image displaying system of claim 1, wherein the first gesture does not correspond to any of the at least one of at least one hyperlink target and at least one active area when a location of the first gesture is not within any of the at least one of at least one hyperlink target and at least one active area.

12. The image displaying system of claim 1, wherein, in response to the first gesture, the image displaying system generates at least one human-sensable output for each of the at least one of at least one hyperlink target and at least one active area.

13. The image displaying system of claim 1, wherein in response to the first gesture, the image displaying system generates the at least one human-sensable output for each of at most n of the at least one of at least one hyperlink target and at least one active area.

14. The image displaying system of claim 13, wherein the at most n of the at least one of at least one hyperlink target and at least one active area are the n closest ones of the at least one of at least one hyperlink target and at least one active area to a location of the first gesture within the displayed image.

15. The image displaying system of claim 1, wherein, in response to the first gesture, the image displaying system generates the at least one human-sensable output for each of the at least one of at least one hyperlink target and at least one active area that at least extend into a designated region of the displayed image within which a location of the first gesture lies.

16. The image displaying system of claim 1, wherein, the at least one human-sensable output is applied serially to the at least one of the at least one of at least one hyperlink target and at least one active area.

17. The image displaying system of claim 16, wherein the at least one human-sensable output is applied serially beginning with a one of the at least one of the at least one of at least one hyperlink target and at least one active area that is closest to a location of the first gesture within the displayed image.

18. The image displaying system of claim 16, wherein the at least one human-sensable output is removed serially from each of the at least one of the at least one of at least one hyperlink target and at least one active area.

19. The image displaying system of claim 18, wherein the at least one human-sensable output is applied to and removed from a current one of the at least one of at least one hyperlink target and at least one active area before the at least one human-sensable output is applied to a next one of the at least one of the at least one hyperlink target and at least one active area.

20. The image displaying system of claim 18, wherein the at least one human-sensable output is applied serially to a next one of the at least one of the at least one of at least one hyperlink target and at least one active area before the at least one human-sensable output is removed serially for a current one of the at least one of the at least one of at least one hyperlink target and at least one active area.

21. The image displaying system of claim 1, wherein the at least one human sensable output is removed serially from each of the at least one of the at least one of at least one hyperlink target and at least one active area.

22. The image displaying system of claim 21, wherein the at least one human-sensable output is removed serially beginning with a one of the at least one of the at least one of at least one hyperlink target and at least one active area that is closest to a location of the first gesture within the displayed image.

23. An image displaying system according to claim 1, wherein the removal of the at least one human-sensable output is in response to at least one of the designated time period expiring and the user inputting a second gesture.

24. An image displaying system according to claim 23, wherein the second gesture corresponds to any of the at least one hyperlink target and at least one active area.

25. A method of locating at least one of at least one of at least one hyperlink target and at least one active area in an image displayed on an image displaying device, comprising:

inputting a first gesture made relative to the displayed image;

determining whether the first input gesture does not correspond to any of the at least one of at least one hyperlink target and at least one active area;

generating, only if the first gesture does not correspond to any of the at least one of at least one hyperlink target and at least one active area, at least one human-sensable output for each of at least one of the at least one of at least one hyperlink target and at least one active area; and in response to at least a designated time period elapsing, removing the at least one human-sensable output from the displayed image.

26. The method of claim 25, wherein generating the at least one human-sensable output includes generating at least one of an altered visual appearance of at least one of the at least one of at least one hyperlink target and at least one active area, at least one locational indicator displayed on the image display device corresponding to at least one of the at least one of at least one hyperlink target and at least one active area, at least one audible output signal corresponding to at least one of the at least one of at least one hyperlink target and at least one active area, at least one tactile output signal corresponding to at least one of the at least one of at least one hyperlink target and at least one active area, and at least one olfactory output signal corresponding to at least one of the at least one of at least one hyperlink target and at least one active area.

27. The method of claim 26, wherein the altered visual appearance generated as the at least one human-sensable output is at least one of highlighting, outlining, color changing, appearance distorting, animating, adding drop-shadows and glyphs, the altered visual appearance usable to distinguish the at least one of the at least one of at least one hyperlink target and at least one active area.

28. The method of claim 26, wherein the locational indicators are at least one of pop-up text windows, directional markers and connecting line segments, the locational indicators usable to direct a user to at least one of the at least one hyperlink target and the at least one active area.

29. The method of claim 25, wherein generating the at least one human-sensable output comprises gradually fading in the at least one human-sensable output during an initial portion of the designated time period.

30. The method of claim 29, wherein removing the at least one human-sensable output comprises gradually fading out the at least one human-sensable output during a final portion of the designated time period.

31. The method of claim 25, wherein removing the at least one human sensable output comprises gradually fading out the at least one human-sensable output during a final portion of the designated time period.

32. The method of claim 25, wherein the designated time period is one of a predetermined time period, a user selectable time period, and a dynamically adjustable time period.

33. The method of claim 25, wherein determining whether the first gesture does not correspond to any of the at least one of the at least one hyperlink target and at least one active area comprises determining that a location of the first gesture is not within any of the at least one of the at least one hyperlink target and at least one active area.

34. The method of claim 25, wherein generating the at least one human-sensable output for at least one of the at least one of at least one hyperlink target and at least one active area in response to the first gesture comprises generating at least one human-sensable output for each of the at least one of at least one hyperlink target and at least one active area in response to the first gesture.

35. The method of claim 34, wherein generating the at least one human-sensable output for at least one of the at least one of at least one hyperlink target and at least one active area in response to the first gesture comprises generating at least one human-sensable output for each of at most n of the at least one of at least one hyperlink target and at least one active area in response to the first gesture.

36. The method of claim 35, wherein generating the at most n of the at least one of at least one hyperlink target and at least one active area comprises generating at least one human sensable output for the n of the at least one of at least one hyperlink target and at least one active area that are closest to a location of the first gesture within the displayed image.

37. The method of claim 25, wherein generating the at least one human-sensable output for the at least one of the at least one of at least one hyperlink target and at least one active area in response to the first input gesture comprises generating the human-sensable output for each of the at least one of at least one hyperlink target and at least one active area that extends into a designated region of the displayed image within which a location of the first gesture lies.

38. The method of claim 25, wherein generating the at least one human-sensable output for each of at least one of the at least one of at least one hyperlink target and at least one active area comprises serially applying the at least one human-sensable output to the at least one of the at least one of at least one hyperlink target and at least one active area.

39. The method of claim 25, wherein generating the at least one human-sensable output for each of at least one of the at least one of at least one hyperlink target and at least one active area comprises serially applying the at least one human-sensable output beginning with a one of the at least one of the at least one of at least one hyperlink target and at least one active area that is closest to a location of the first gesture within the displayed image.

40. The method of claim 25, wherein removing the at least one human-sensable output comprises serially removing the at least one human-sensable output from each of the at least one of the at least one of at least one hyperlink target and at least one active area.

41. The method of claim 40, wherein generating the at least one human-sensable output for each of at least one of the at least one of at least one hyperlink target and at least one active area and removing the at least one human-sensable output comprises applying the at least one human-sensable output to and removing the at least one human-sensable output from a current one of the at least one of at least one hyperlink target and at least one active area before applying the at least one human-sensable output to a next one of the at least one of the at least one hyperlink target and at least one active area.

42. The method of claim 40, wherein generating the at least one human-sensable output for each of at least one of the at least one of at least one hyperlink target and at least one active area comprises serially applying the at least one human-sensable output to a next one of the at least one of the at least one of at least one hyperlink target and at least one active area before serially removing the at least one human-sensable output from a current one of the at least one of the at least one of at least one hyperlink target and at least one active area.

43. The method of claim 25, wherein removing the at least one human-sensable output comprises serially removing the at least one human sensable output from each of the at least one of the at least one of at least one hyperlink target and at least one active area.

44. The method of claim 43, wherein removing the at least one human-sensable output from each of at least one of the at least one of at least one hyperlink target and at least one active area comprises serially removing the at least one human-sensable output beginning with a one of the at least one of the at least one of at least one hyperlink target and at least one active area that is closest to a location of the first gesture within the displayed image.

45. The method of claim 25, wherein removing the at least one human-sensable output is in response to at least one of at least the designated time period expiring and the user inputting a second gesture.

46. The method of claim 45, wherein the second gesture corresponds to any of the at least one hyperlink target and at least one active area.

* * * * *